US010157449B1

(12) United States Patent
Chang et al.

(10) Patent No.: US 10,157,449 B1
(45) Date of Patent: *Dec. 18, 2018

(54) GEO-LOCATION-BASED IMAGE FILTERS

(71) Applicant: Snap Inc., Venice, CA (US)

(72) Inventors: Sheldon Chang, Venice, CA (US); Chamal Samaranayake, Venice, CA (US); Timothy Michael Sehn, Marina Del Rey, CA (US); Rong Yan, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,966

(22) Filed: Jul. 27, 2017

Related U.S. Application Data

(63) Continuation of application No. 14/593,065, filed on Jan. 9, 2015, now Pat. No. 9,754,355.

(51) Int. Cl.
G06K 9/40 (2006.01)
G06T 5/00 (2006.01)
G06F 17/30 (2006.01)
G06K 9/48 (2006.01)

(52) U.S. Cl.
CPC .......... *G06T 5/00* (2013.01); *G06F 17/30244* (2013.01); *G06F 17/30256* (2013.01); *G06K 9/48* (2013.01)

(58) Field of Classification Search
None
See application file for complete search history.

(56) References Cited

U.S. PATENT DOCUMENTS

| 666,223 A | 1/1901 | Shedlock |
| 4,581,634 A | 4/1986 | Williams |
| 4,975,690 A | 12/1990 | Torres |
| 5,072,412 A | 12/1991 | Henderson, Jr. et al. |

(Continued)

FOREIGN PATENT DOCUMENTS

| CA | 2887596 A1 | 7/2015 |
| EP | 2051480 A1 | 4/2009 |

(Continued)

OTHER PUBLICATIONS

"U.S. Appl. No. 14/593,065 Response filed Jan. 31, 2017 to Final Office Action dated Oct. 31, 2016", 13 pgs.

(Continued)

*Primary Examiner* — Sean M Conner
(74) *Attorney, Agent, or Firm* — Schwegman Lundberg & Woessner, P.A.

(57) ABSTRACT

Systems and methods for generating and distributing photo filters are described. A photo filter publication application receives filter data and object criteria and generates a photo filter based on the filter data. The photo filter is associated with satisfaction of the object criteria. A photo filter engine then identifies that a client device has taken a photograph. The photo filter engine then provides the photo filter to the client device based on the photograph including an object that satisfies the object criteria. The photo filter may then be displayed as an option on a user interface of the client device. The object criteria may include associations between an object and a source of image data, for example, a brand of a merchant in which case the associated photo filter may include images associated with the brand of the merchant.

20 Claims, 17 Drawing Sheets

(56) References Cited

U.S. PATENT DOCUMENTS

| | | |
|---|---|---|
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach, Jr. et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler et al. |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Bröndrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,564,486 B2 | 7/2009 | Ikeda |
| 7,565,139 B2 | 7/2009 | Neven, Sr. et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,400,548 B2 | 3/2013 | Bilbrey et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |

(56) References Cited

U.S. PATENT DOCUMENTS

| | | |
|---|---|---|
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,972,357 B2 | 3/2015 | Shim et al. |
| 8,977,627 B1 | 3/2015 | Vijayanarasimhan et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,754,355 B2 | 9/2017 | Chang et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0008263 A1 | 1/2004 | Sayers et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0100487 A1 | 5/2004 | Mori et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0182541 A1 | 8/2007 | Harris et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |

(56) References Cited

U.S. PATENT DOCUMENTS

| | | |
|---|---|---|
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0247668 A1 | 10/2007 | Fuchs et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0069477 A1 | 3/2008 | Engels et al. |
| 2008/0075361 A1 | 3/2008 | Winn et al. |
| 2008/0076505 A1 | 3/2008 | Nguyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay et al. |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0028444 A1 | 1/2009 | Hwang et al. |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind et al. |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Bartel |
| 2009/0192900 A1 | 7/2009 | Collison |
| 2009/0196465 A1 | 8/2009 | Menon |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0257623 A1 | 10/2009 | Tang et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li et al. |
| 2010/0027961 A1 | 2/2010 | Gentile et al. |
| 2010/0053342 A1 | 3/2010 | Hwang et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0260426 A1 | 10/2010 | Huang et al. |
| 2010/0273509 A1 | 10/2010 | Sweeney et al. |
| 2010/0281045 A1 | 11/2010 | Dean |
| 2010/0306669 A1 | 12/2010 | Della |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0081047 A1 | 4/2011 | Momosaki |
| 2011/0083101 A1 | 4/2011 | Sharon et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0137895 A1 | 6/2011 | Petrou et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0194747 A1 | 8/2011 | Wieczorek |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |

(56) References Cited

U.S. PATENT DOCUMENTS

| | | |
|---|---|---|
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0201472 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0263385 A1 | 10/2012 | Van Zwol et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0314434 A1 | 11/2013 | Shetterly et al. |
| 2013/0325964 A1 | 12/2013 | Berberat |
| 2013/0329060 A1 | 12/2013 | Yim |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0012417 A1 | 1/2014 | Zelivinski et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0071045 A1 | 3/2014 | Muchnick et al. |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0171039 A1 | 6/2014 | Bjontegard |
| 2014/0173424 A1 | 6/2014 | Hogeg et al. |
| 2014/0173457 A1 | 6/2014 | Wang et al. |
| 2014/0176732 A1 | 6/2014 | Cohen et al. |
| 2014/0189592 A1 | 7/2014 | Benchenaa et al. |
| 2014/0192137 A1 | 7/2014 | Kim et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0240352 A1 | 8/2014 | Kuncl et al. |
| 2014/0244488 A1 | 8/2014 | Kim et al. |

(56) References Cited

U.S. PATENT DOCUMENTS

| | | |
|---|---|---|
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289833 A1 | 9/2014 | Briceno et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0341425 A1 | 11/2014 | Babacan et al. |
| 2014/0341482 A1 | 11/2014 | Murphy-Chutorian et al. |
| 2014/0359024 A1 | 12/2014 | Spiegel |
| 2014/0359032 A1 | 12/2014 | Spiegel et al. |
| 2015/0009349 A1 | 1/2015 | Kim |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0117777 A1 | 4/2015 | Hsun |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0193982 A1 | 7/2015 | Mihelich et al. |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0127653 A1 | 5/2016 | Lee et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0203586 A1 | 7/2016 | Chang et al. |
| 2016/0239248 A1 | 8/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0006094 A1 | 1/2017 | Abou et al. |
| 2017/0061308 A1 | 3/2017 | Chen et al. |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | | |
|---|---|---|---|
| EP | 2151797 A1 | | 2/2010 |
| GB | 2399928 A | | 9/2004 |
| KR | 19990073076 A | | 10/1999 |
| KR | 20010078417 A | | 8/2001 |
| KR | 101881715 B1 | | 7/2018 |
| WO | WO-1996024213 A1 | | 8/1996 |
| WO | WO-1999063453 A1 | | 12/1999 |
| WO | WO-2000058882 A1 | | 10/2000 |
| WO | WO-2001029642 A1 | | 4/2001 |
| WO | WO-2001050703 A3 | | 7/2001 |
| WO | WO-2006118755 A2 | | 11/2006 |
| WO | WO-2009043020 A2 | | 4/2009 |
| WO | WO-2011040821 A1 | | 4/2011 |
| WO | WO-2011119407 A1 | | 9/2011 |
| WO | WO-2012000107 A1 | | 1/2012 |
| WO | WO-2013008238 | | 1/2013 |
| WO | WO-2013008251 A2 | | 1/2013 |
| WO | WO-2013045753 A1 | | 4/2013 |
| WO | WO-2014068573 A1 | | 5/2014 |
| WO | WO-2014115136 A1 | | 7/2014 |
| WO | WO-2014194262 A2 | | 12/2014 |
| WO | WO-2015192026 A1 | | 12/2015 |
| WO | WO-2016044424 A1 | | 3/2016 |
| WO | WO-2016054562 A1 | | 4/2016 |
| WO | WO-2016065131 A1 | | 4/2016 |
| WO | WO-2016100318 A2 | | 6/2016 |
| WO | WO-2016100318 A3 | | 6/2016 |
| WO | WO-2016100342 A1 | | 6/2016 |
| WO | WO-2016/112299 A1 | | 7/2016 |
| WO | WO-2016112299 A1 | | 7/2016 |
| WO | WO-2016149594 A1 | | 9/2016 |
| WO | WO-2016179166 A1 | | 11/2016 |
| WO | WO-2016179235 A1 | | 11/2016 |
| WO | WO-2017176739 A1 | | 10/2017 |
| WO | WO-2017176992 A1 | | 10/2017 |
| WO | WO-2018005644 A1 | | 1/2018 |

OTHER PUBLICATIONS

"U.S. Appl. No. 14/593,065, Advisory Action dated Jan. 22, 2016", 3 pgs.

"U.S. Appl. No. 14/593,065, Advisory Action dated Feb. 17, 2017", 3 pgs.

"U.S. Appl. No. 14/593,065, Final Office Action dated Oct. 15, 2015", 18 pgs.

"U.S. Appl. No. 14/593,065, Final Office Action dated Oct. 31, 2016", 18 pgs.

"U.S. Appl. No. 14/593,065, Non Final Office Action dated May 22, 2015", 20 pgs.

"U.S. Appl. No. 14/593,065, Non Final Office Action dated Jun. 30, 2016", 18 pgs.

"U.S. Appl. No. 14/593,065, Notice of Allowabiiity dated Aug. 1, 2017", 4 pgs.

"U.S. Appl. No. 14/593,065, Notice of Allowance dated Apr. 27, 2017", 9 pgs.

"U.S. Appl. No. 14/593,065, Response filed Apr. 15, 2016 to Advisory Action dated Jan. 22, 2016", 16 pgs.

"U.S. Appl. No. 14/593,065, Response filed Jul. 22, 2015 to Non Final Office Action dated May 22, 2015", 11 pgs.

"U.S. Appl. No. 14/593,065, Response filed Sep. 30, 2016 to Non Final Office Action dated Jun. 30, 2016", 12 pgs.

"U.S. Appl. No. 14/593,065, Response filed Dec. 14, 2015 to Final Office Action dated Oct. 15, 2015", 15 pgs.

"International Application Serial No. PCT/US2016/012661, International Preliminary Report on Patentability dated Jul. 20, 2017", 10 pgs.

"International Application Serial No. PCT/US2016/012661, International Search Report dated Mar. 18, 2016", 5 pgs.

"International Application Serial No. PCT/US2016/012661, Written Opinion dated Mar. 18, 2016", 8 pgs.

IKEA USA, "The New IKEA Catalog App: Create Your Space—YouTube (with video)", [Online]. Retrieved from the Internet: <URL: https://www.youtube.com/watch?v=uaxtLru4-Vw, (Aug. 2, 2013), 3 pgs; video: 1 minute, 23 seconds.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Metaio AR, "Metaio presents Augmented Reality for Smart Watches—YouTube (with video)", [Online]. Retrieved from the Internet: <URL: https://www.youtube.com/watch?v=XyO972dT4TI>, (Jul. 8, 2014), 3 pgs; video: 1 minute, 26 seconds.

(56) References Cited

OTHER PUBLICATIONS

Silverstein, Goodby, "Haagen-Dazs, "Concerto Timer"—YouTube (with video)", [Online]. Retrieved from the Internet: <URL: https://www.youtube.com/watch?v—vYJWifof8vY, (Oct. 21, 2013), 3 pgs; video: 1 minute, 10 seconds.
"European Application Serial No. 16735481.0, Extended European Search Report dated Dec. 19, 2017", 8 pgs.
MacCarthy, Andrew, "How to Create a Snapchat Geofilter tutorial + Photoshop & Illustrator Templates (.psd and .ai)", [Online] Retrieved from the Internet: <http://andrewmacarthy.com/andrew-macarthy-social-media/how-to-create-snapchat-geofilter-photoshop-illustrator-template>, (Dec. 6, 2014).
"A Whole New Story", [Online]. Retrieved from the Internet: <https://www.snap.com/en-US/news/>, (2017), 13 pgs.
"Adding a watermark to your photos", eBay, [Online]. Retrieved from the Internet:<URL:http://pages.ebay.com/help/sell/pictures.html>, (accessed May 24, 2017), 4 pgs.
"BlogStomp", [Online]. Retrieved from the Internet:<URL:http://stompsoftware.com/blogstomp>, (accessed May 24, 17), 12 pgs.
"Cup Magic Starbucks Holiday Red Cups come to life with AR app", [Online]. Retrieved from the Internet:<http://www.blastradius.com/work/cup-magic>, (2016), 7 pgs.
"Daily App: InstaPlace (iOS/Android): Give Pictures a Sense of Place", TechPP, [Online]. Retrieved from the Internet:<URL;http://techpp.com/2013/02/15/instaplace-app-review>, (2013), 13 pgs.
"InstaPlace Photo App Tell the Whole Story", [Online]. Retrieved from the Internet; <https://youtu.be/uF_gFkg1hBM>, (Nov. 8, 2013), 113 pgs.
"International Application Serial No. PCT/US2015/037251, International Search Report dated Sep. 29, 2015", 2 pgs.
"Introducing Snapchat Stories", [Online]. Retrieved from the Internet:<https://www.youtube.com/watch?v=88Cu3yN-LIM>, (Oct. 3, 2013), 92 pgs.
"Korean Application Serial No. 10-2017-7022263, Response filed Mar. 30, 2018 to Notice of Preliminary Rejection dated Feb. 1, 2018", w/ English Claims, 14 pgs.
"Macy's Believe-o-Magic", {Online}. Retrieved from the Internet: <https://www.youtube.com/watch?v=xvzRXv3J0Z0>, (Nov. 7, 2011), 102 pgs.
"Macy's Introduces Augmented Reality Experience in Stores across Country as Part of Its 2011 Believe" Campaign, [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.
"Starbucks Cup Magic", {Onliine}. Retrieved from the Internet: <https://www.youtube.com/watch?v=RWwQXi9RG0w>, (Nov. 8, 2011), 87 pgs.
"Starbucks Cup Magic for Valentine's Day", {Online}. Retrieved from the Internet: <https://www.youtube.com/watch?v=8nqOzjq10w>, (Feb. 6, 2012), 88 pgs.
"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobil Just Won Filters", [Online]. Retrieved from the Internet: URL<https://techcrunch.com/2011/09/08/mobli-filters>, (Sep. 8, 2011), 10 pgs.
Janthong, Isaranu, "Android App Review Thailand", [Online], Retrieved from the Internet:http://www.android-free-app-review.com/2013/01/instaplace-android-google-play-store.html>, (Jan. 23, 2013), 9 pgs.
Macleod, Duncan, "Macys Believe-o-Magic App", [Online]. Retrieved from the Internet:<URL:http://theinspirationroom.com/daily/2011/macys-believe-o-magic-app>, (Nov. 14, 2011), 10 pgs.
Macleod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.
Notopoulos, Katie, "A Guide to the New Snapchat Filters and Big Fonts", [Online]. Retrieved from the Internet:<https://wvm.buzzfeed.com/katienotopoulos/a-guide-to-the-new-snapchat-filters-and-big-fonts?utm_term=bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", [Online], Retrieved from the Internet: <https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark images in PHP and Save File on Server", [Online]. Retrieved from the Internet: <URL:http://code.rohitink.com/2012/12/28/watermark-images-in-php-and-save-file-on-server/, (Dec. 28, 2012), 4 pgs.
"U.S. Appl. No. 15/965,038, Examiner Interview Summary mailed Aug. 23, 2018", 3 pgs.
"U.S. Appl. No. 15/965,038, Non Final Office Action dated Jun. 14, 2018", 20 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Melanson, Mike, "This text message will self destruct in 60 seconds", URL: http://readwrite.com/2011/02/11/this_text_message_will_self_destruct_in_60_seconds, (Feb. 18, 2015), 4 pgs.
Sawers, Paul, "Snapchat for iOS Lets You Send Photos to Friends and Set How long They're Visible for", URL: https://thenextweb.com/apps/2012/05/07/snapchat-for-ios-lets-you-send-photos-to-friends-and-set-how-long-theyre-visible-for/, (May 7, 2012), 5 pgs.
Shein, Esther, "Ephemeral Data", Communications of the ACM, vol. 56, No. 9, (Sep. 2013), 20-22.
Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.
"U.S. Appl. No. 15/965,038, Response filed Sep. 11, 2018 to Non Final Office Action dated Jun. 14, 2018", 13 pgs.

US 10,157,449 B1

GEO-LOCATION-BASED IMAGE FILTERS

PRIORITY

This application is a continuation of and claims the benefit of priority of U.S. patent application Ser. No. 14/593,065, filed on Jan. 9, 2015, which is hereby incorporated by reference herein in its entirety

TECHNICAL FIELD

The subject matter disclosed herein generally relates to generating and distributing photo filters. More specifically, the present disclosure addresses systems and methods for presenting photo filters on a user interface of a mobile device based on recognizing, in a photograph taken with the mobile device, objects that satisfy specified object criteria.

BACKGROUND

The number of digital photographs taken with mobile wireless devices is increasing and may soon outnumber photographs taken with dedicated digital and film based cameras. Thus, there is a growing need to improve the experience associated with mobile wireless digital photography by providing a broader range of features that is often associated with dedicated digital and film based cameras.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
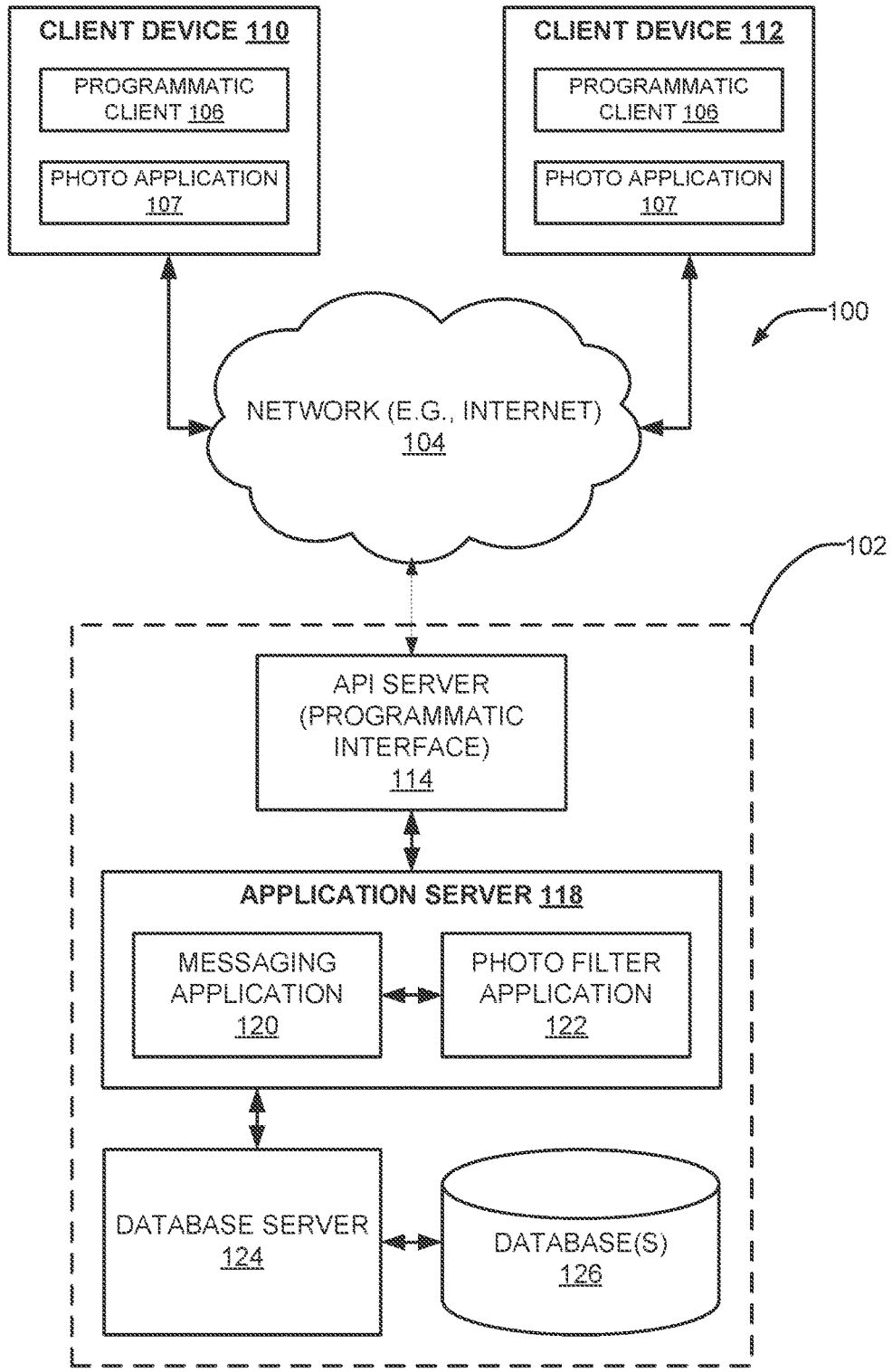
FIG. 1 is a network diagram depicting a network system having a client-server architecture configured for exchanging data over a network, according to one embodiment.

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The addition of labels, drawings and other artwork to photographs provides a compelling way for users to personalize, supplement and enhance these photographs before storage or publication to a broader audience. An example technology provides users with a set of photo filters (e.g., providing enhancements and augmentations) that can be applied to a photograph taken by the user. The set of photo filters (e.g., image overlays) may be determined based on a recognition of an object in the photograph that satisfies specified object criteria associated with a photo filter. In this way, the photo filters are presented to a user for selection and use with the photograph based on a recognized content of the photograph. For example, if the user takes a photograph and an object in the photograph is recognized as the Empire State Building, photo filters associated with the Empire State Building may be provided to the user for use with the photograph. In this example, a picture of the Empire State Building may use a King Kong filter that would place the giant ape on the Empire State Building in the photograph at different perspectives. Therefore, a picture of the south face of the Empire State Building might see King Kong's back, while a picture from the north face might see King Kong's face looking at you. In this example, provision of the King Kong filter may also be constrained by a geo-fence (e.g., geographic boundary) around the area in New York including the Empire State Building. Of course, further Empire State Building-themed photo filters may also be presented to the user. The presentation of the photo filters to the user may be in response to the user performing a gesture (e.g. a swipe operation) on a screen of the mobile device. Furthermore, although some example embodiments describe the use of filters in conjunction with photographs, it should be noted that other example embodiments contemplate the use of filters with videos.

Third party entities (e.g., merchants, restaurants, individual users, etc.) may, in one example embodiment, create photo filters for inclusion in the set presented for user selection based on recognition of an object satisfying criteria specified by the creator of the photo filter. For example, a photograph including an object recognized as a restaurant may result in the user being presented with photo filters that overly a menu of the restaurant on the photograph. Or a photograph including an object recognized as a food type may result in the user being presented with photo filters that let the user view information e.g., calories, fat content, cost or other information associated with the food type. Third party entities may also bid (or otherwise purchase opportunities) to have a photo filter included in a set presented to a user for augmentation of a particular photograph. Described below are various systems and methods for implementing the above described photograph enhancements.

More specifically, various examples of a photo filter application are described. The photo filter application includes a photo filter publication module that operates at a server, in some embodiments, and generates photo filters based on filter data associated with the satisfaction of specified object criteria by objects recognized in a photograph. In other embodiments, some or all of the functionality provided by the photo filter publication module may be resident on client devices. A photo filter may be generated based on supplied filter data that may include audio and/or visual content or visual effects that can be applied to augment the photograph at a mobile computing device. The photo filter publication module may itself include a user-based photo filter publication module and a merchant-based photo filter publication module.

The photo filter application also includes a photo filter engine that determines that a mobile device has taken a photograph and, based on the photograph including an object that satisfies the object criteria, provides the photo filter to the client device. To this end, the photo filter engine includes an object recognition module configured to find and identify objects in the photograph; and compare each object against the object criteria. The object criteria may include associations between an object and a source of image data, for example exhibits in a museum, in which case the associated photo filter may include images including data associated with a specific exhibit in the museum.

Using the user-based photo filter publication module, the photo filter publication application provides a Graphical User Interface (GUI) for a user to upload filter data for generating a photo filter and object criteria for comparing to recognized objects in a photograph. For example, the user may upload a logo image for the creation of a photo filter and specify criteria that must be satisfied by an object recognized in the photograph in order for the filter to be made available to a mobile device. Once the user submits the logo and specifies the object criteria, the photo filter publication module generates a photo filter that includes the logo and is associated with satisfaction of the specified object criteria. As such, mobile devices that have taken a photograph including a recognized object that satisfies the specified object criteria may have access to the logo-photo filter.

In other examples, if a photograph includes more than a specified number of objects that satisfy specified object criteria, the photo filter engine may use a photo filter priority module to generate a ranking of photo filters associated with object criteria satisfied by the objects in the photograph based on specified photo filter priority criteria. The photo filter engine may then provide the specified number of the photo filters to the client device according to the ranking of the photo filters, which may be based on any combination of a photo filter creation date, a photo filter type, a user ranking of the photo filter, etc.

Using the merchant-based photo filter publication module, the photo filter publication application provides a GUI for merchants to upload filter data and object criteria, and submit bids for the presentation of a photo filter based on the uploaded filter data based on the satisfaction of the uploaded object criteria by an object recognized in a photograph. A bidding process may be used to determine the merchant with the highest bid amount. That merchant can then exclude publication of photo filters from other merchants (with lower bids) that might otherwise be published based on satisfaction of the uploaded object criteria. Therefore, the photo filter of the highest bidding merchant may be the only photo filter that can be accessed by mobile devices that have taken a photograph including a recognized object that satisfies the uploaded object criteria. In examples, the common object criteria includes a type of object for which multiple merchants sell branded products of the same type.

The photo filter engine includes a collection module to store previously provided photo filters in a photo filter collection associated with a client device. The collection module may then instruct the photo filter publication module to provide a new photo filter to the client device in response to the photo filter collection including a specified number of a type of photo filter. The collection module may operate based on promotions from a merchant. For example, the collection module may be used to implement a game at a restaurant by providing certain premium photo filters to the client device only after the client device has collected a specified number of photo filters of a specified type, e.g., associated with recognition of a menu item. In an example, the premium photo filter may be used to obtain discounts and/or prizes at the restaurant.

The photo filter engine includes a count module to generate a count of objects of a specified object type identified in photographs taken by the client device. The count module may then instruct the photo filter publication module to adjust a content of a photo filter associated with the specified object type in response to the count reaching a specified threshold value. The count module may also operate based on promotions from a merchant. For example, the count module may be used to implement a game at a restaurant by adjusting the content of photo filters associated with a certain menu item only after the count of photos including objects recognized as the menu item of the brand reaches a specified threshold value. In an example, a photo filter associated with the menu item may be adjusted to include celebratory graphics that may be used to commemorate the user's achievements in ordering a certain number of menu items.

The photo filter publication modules include a video-creation module to provide a video-creation photo filter to the mobile device. For example, the photo filter engine may recognize an object in foreground of a photograph and alter the background (e.g., by adding motion) of the photograph to create a video including the recognized object (i.e., to make it appear as if the object is moving). Alternatively the photo filter engine may recognize an object in foreground of a photograph and add motion to the object in order to create a video including the recognized object.

System Architecture

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and photo communication, determining geolocation) and aspects (e.g., publication of photo filters, management of photo filters) associated with the network system 100 and its users. Although illustrated herein as client-server architecture, other embodiments may include other network architectures, such as peer-to-peer or distributed network environments.

A data exchange platform, in an example, includes a messaging application 120 and a photo filter application 122, and may provide server-side functionality via a network 104 (e.g., the Internet) to one or more clients. Although described as residing on a server in some embodiments, in other embodiments some or all of the functions of photo filter application 122 may be provided by a client device. The one or more clients may include users that use the network system 100 and, more specifically, the messaging application 120 and the photo filter application 122, to exchange data over the network 104. These operations may include transmitting, receiving (communicating), and processing data to, from, and regarding content and users of the network system 100. The data may include, but is not limited to, content and user data such as user profiles, messaging content, messaging attributes, photo attributes, client device information, geolocation information, photo filter data, object recognition data, object criteria for recognized objects in a photograph, among others.

In various embodiments, the data exchanges within the network system 100 may be dependent upon user-selected functions available through one or more client or user interfaces (UIs). The UIs may be associated with a client machine, such as client devices 110, 112 using a programmatic client 106, such as a client application. The programmatic client 106 may be in communication with the messaging application 120 and photo filter application 122 via an application server 118. The client devices 110, 112 include mobile devices with wireless communication components, and audio and optical components for capturing various forms of photo including photos and videos (e.g., photo application 107).

Turning specifically to the messaging application 120 and the photo filter application 122, an application program interface (API) server 114 is coupled to, and provides programmatic interface to one or more application server(s) 118. The application server 118 hosts the messaging application 120 and the photo filter application 122. The application server 118 is, in turn, shown to be coupled to one or more database servers 124 that facilitate access to one or more databases 126.

The API server 114 communicates and receives data pertaining to messages and photo filters, among other things, via various user input tools. For example, the API server 114 may send and receive data to and from an application (e.g., via the programmatic client 106) running on another client machine (e.g., client devices 110, 112 or a third party server).

In one example embodiment, the messaging application 120 provides messaging mechanisms for users of the client devices 110, 112 to send messages that include text and photo content such as pictures and video. The client devices 110, 112 can access and view the messages from the messaging application 120. Components of the messaging application 120 are described in more detail below with respect to FIG. 2.

In one example embodiment, the photo filter application 122 provides a system and a method for operating and publishing photo filters for distribution via messages processed by the messaging application 120. The photo filter application 122 supplies a photo filter to the client device 110 based on a recognized object in a photograph taken with the client device 110 satisfying specified object criteria. In another example, the photo filter application 122 supplies a photo filter to the client device 110 based on the photo filter being associated with a winning bid from a merchant who created the photo filter. In other example embodiments, photo filters from merchants may be provided on a flat fee basis (e.g., a merchant agrees to pay a fixed amount for the presentation of filters), a cost per view basis, or the like.

The photo filter may include audio and visual content and visual effects. Examples of audio and visual content include pictures, texts, logos, animations, and sound effects. An example of a visual effect includes color filtering. The audio and visual content or the visual effects can be applied to a photograph stored at the client device 110. For example, the photo filter may include text that can be overlaid on top of a photograph taken by the client device 110. In other examples, the photo filter may include images associated with a location, a merchant, a brand, a work of art, an animal, a person, etc. For example, in regard to a merchant, the photo filter may include indicia associated with the merchant like logos and/or other images (e.g., a spokesperson) related to the merchant. The photo filters may be stored in the database(s) 126 and accessed through the database server 124.

The photo filter application 122 includes a photo filter publication module that generates photo filters based on filter data associated with the satisfaction of specified object criteria by objects recognized in a photograph taken by the client device 110. A photo filter may be generated based on supplied filter data that may include audio and/or visual content or visual effects that can be applied to augment the photograph. The photo filter publication module may itself include a user-based photo filter publication module and a merchant-based photo filter publication module In one example embodiment, the photo filter application 122 includes a user-based publication module that enables users to upload filter data for generating a photo filter and object criteria for comparing against recognized objects in a photograph. For example, the user may upload a logo image for the creation of a photo filter and specify criteria that must be satisfied by an object recognized in the photograph in order for the filter to be made available to a mobile device. Once the user submits the logo and specifies the object criteria, the photo filter publication module generates a photo filter that includes the logo and is associated with satisfaction of the specified object criteria.

In another example embodiment, the photo filter application 122 includes a merchant-based publication module that enables merchants to to upload filter data and object criteria, and submit bids for the presentation of a photo filter based on the uploaded filter data based on the satisfaction of the uploaded object criteria by an object recognized in a photograph. A bidding process may be used to determine the merchant with the highest bid. That merchant can then exclude publication of photo filters from other merchants (with lower bids) that might otherwise be published based on satisfaction of the uploaded object criteria. Components of the photo filter application 122 are described in more detail below with respect to FIG. 3.

Messaging Application

Figure 2:
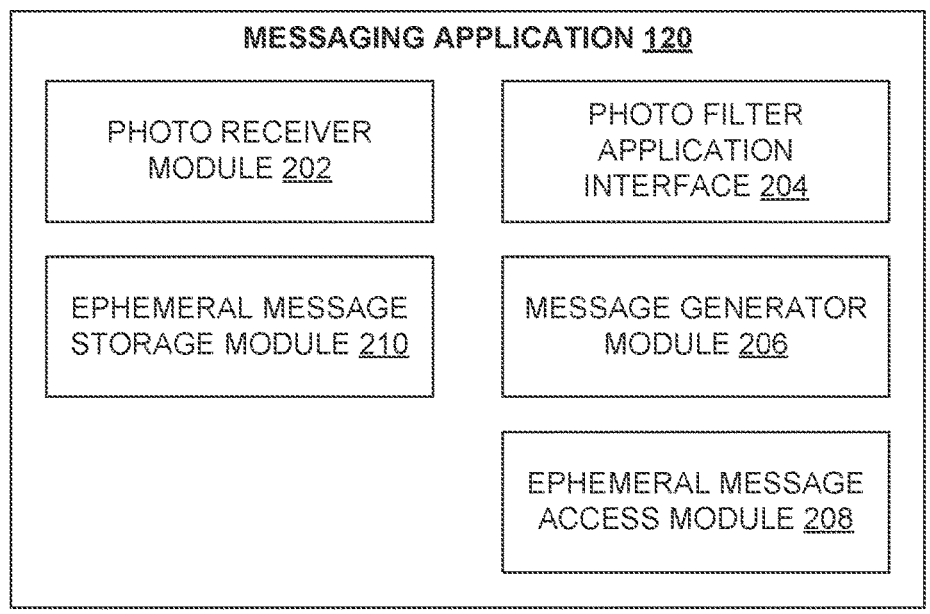
FIG. 2 shows a block diagram illustrating one example embodiment of a messaging application.

FIG. 2 shows a block diagram illustrating one example embodiment of the messaging application 120. The messaging application 120 may be hosted on dedicated or shared server machines (not shown) that are communicatively coupled to enable communications between server machines. The messaging application 120 and the photo filter application 122 themselves are communicatively coupled (e.g., via appropriate interfaces) to each other and to various data sources, so as to allow information to be passed between the messaging application 120 and the photo filter application 122, or so as to allow the messaging application 120 and the photo filter application 122 to share and access common data. The messaging application 120 and the photo filter application 122 may, furthermore, access the one or more databases 126 via the database server(s) 124.

The messaging application 120 is responsible for the generation and delivery of messages between users of the programmatic client 106. The messaging application 120 may use any one of a number of message delivery networks and platforms to deliver messages to users. For example, the messaging application 120 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

The messaging application 120 includes a photo receiver module 202, a photo filter application interface 204, a message generator module 206, an ephemeral message access module 208, and an ephemeral message storage module 210. The photo receiver module 202 receives a message from the programmatic client 106 of the client device 110. The message may include a combination of text, photo, or video. The photo receiver module 202 may also receive metadata associated with the message. The metadata may include a timestamp or geo-location information associated with the client device 110. The photo filter application interface 204 communicates with the photo filter application 122 to access and retrieve a photo filter associated with specified object criteria satisfied by an object recognized (e.g., by the photo filter engine) in a photograph taken by client device 110. The message generator module 206 attaches the retrieved photo filter to the message from the programmatic client 106 to create an ephemeral message and temporarily store the ephemeral message with the ephemeral message storage module 210.

The ephemeral message access module 208 notifies a recipient of the message of the availability of the ephemeral message. The ephemeral message access module 208 receives a request to access the ephemeral message from the recipient and causes the ephemeral message to be displayed on a client device of the recipient for a specified duration. Once the recipient views the message for the specified duration, the ephemeral message access module 208 causes the client device of the recipient to stop displaying the ephemeral message, and deletes the ephemeral message from the ephemeral message storage module 210.

Photo Filter Application

Figure 3:
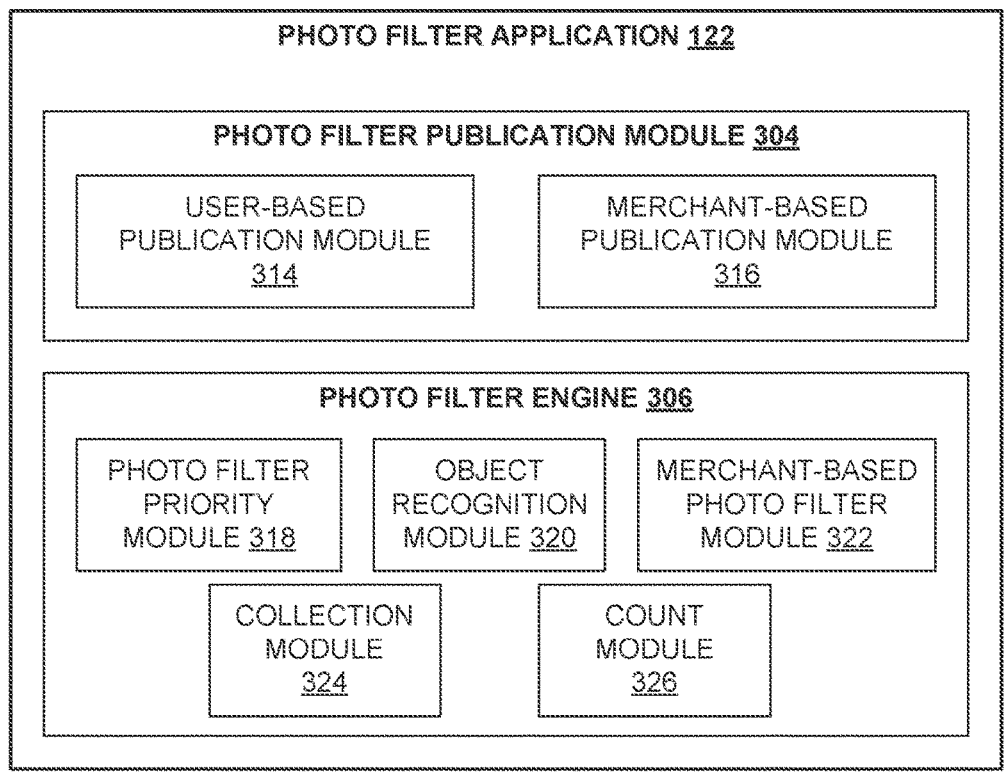
FIG. 3 shows a block diagram illustrating one example embodiment of a photo filter application.

FIG. 3 shows a block diagram illustrating one example embodiment of the photo filter application 122. The photo filter application 122 includes a photo filter publication module 304 and a photo filter engine 306.

The photo filter publication module 304 provides a platform for publication of photo filters. In an example embodiment, the photo filter publication module 304 includes a user-based publication module 314 and a merchant-based publication module 316. The user-based publication module 314 enables users of client devices (either mobile or web clients) to upload filter data for generating a photo filter and object criteria for comparing against recognized objects in a photograph. The merchant-based publication module 316 enables merchants to upload filter data and object criteria, and submit bids for the presentation of a photo filter based on the uploaded filter data based on the satisfaction of the uploaded object criteria by an object recognized in a photograph. The user-based publication module 314 is described in more detail below with respect to FIG. 4A. The merchant-based publication module 316 is described in more detail below with respect to FIG. 5A.

The photo filter engine 306 identifies that a client device (e.g., 110) has taken a photograph and visually searches the photograph in order to recognize objects in the photograph. In one example embodiment, the photo filter engine 306 includes a photo filter priority module 318, an object recognition module 320, a merchant-based photo filter module 322, a collection module 324 and a count module 326. The photo filters provided to a client device 110 by the photo filter engine 306 may be based on: object criteria determined to be satisfied, via object recognition module 320, by a recognized object in the photograph; a ranking of photo filters by the photo filter priority module 318, and/or a winning bid from a merchant as determined via the merchant-based photo filter module 322.

In examples, the photo filter engine includes a collection module 324 to store previously provided photo filters in a photo filter collection associated with a client device 110. The collection module 324 may then instruct the photo filter publication module 314 to provide a new photo filter to the client device 110 in response to the photo filter collection including a specified number of a type of photo filter. The number may be specified by the user or merchant uploading the content used to generate the photo filter.

In examples, if a photograph includes more than a specified number of objects that satisfy specified object criteria, the photo filter engine 306 may use the photo filter priority module 318 to generate a ranking of photo filters associated with the object criteria satisfied by the objects in the photograph based on specified photo filter priority criteria. The photo filter engine 306 may then provide the specified number of the photo filters to the client device 110 according to the ranking of the photo filters, which may be based on any combination of: a photo filter creation date; a photo filter type; a user ranking of the photo filter; etc.

The object recognition module 320 first visually searches the photograph in order to find and identify objects in the photograph. This may be accomplished via known object recognition techniques such as edge matching, greyscale matching, large model bases, gradient matching, etc. The object recognition module 320 then compares each recognized object against the specified object criteria to determine if object criteria associated with a particular photo filter has been satisfied and, if so, providing said photo filter to the client device 110. The object criteria may include associations between an object and a source of image data, for example a specific animal, in which case the associated photo filter may include images including data associated with a specific animal.

The merchant-based photo filter module 322 supplies the client device with a merchant-based photo filter generated by the merchant-based photo filter publication module 316 based on a bidding process used to determine the merchant with the highest bid amount in regard to a specified object criteria. The merchant with the highest bid can then exclude publication of photo filters from other merchants with lower bids that might otherwise be published (to the client device 110) based on satisfaction of the specified object criteria.

Figure 4A:
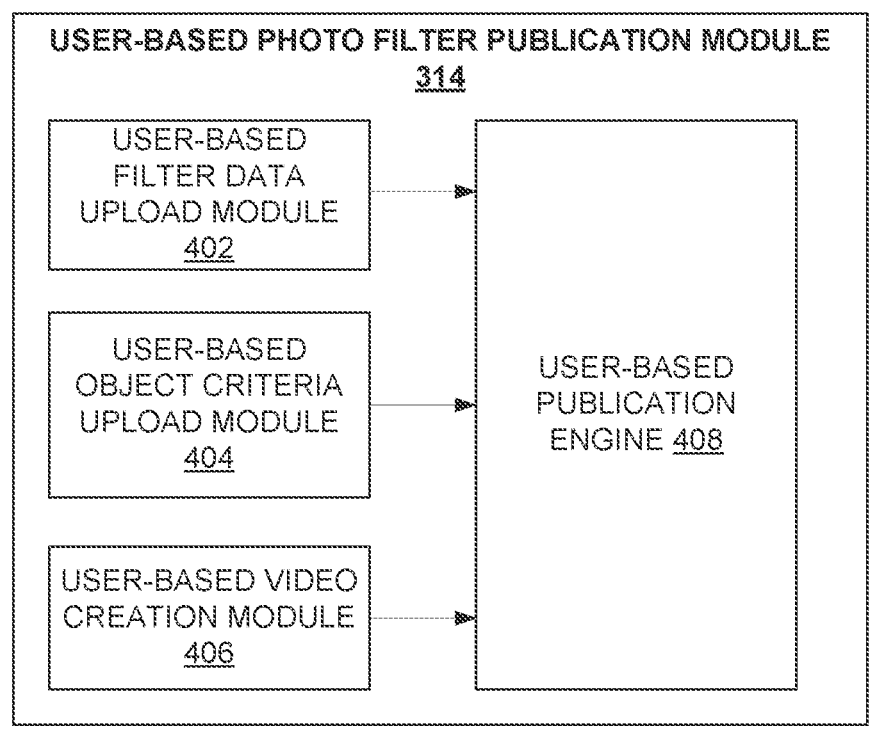
FIG. 4A shows a block diagram illustrating one example embodiment of a user-based photo filter publication module.
Figure 4B:
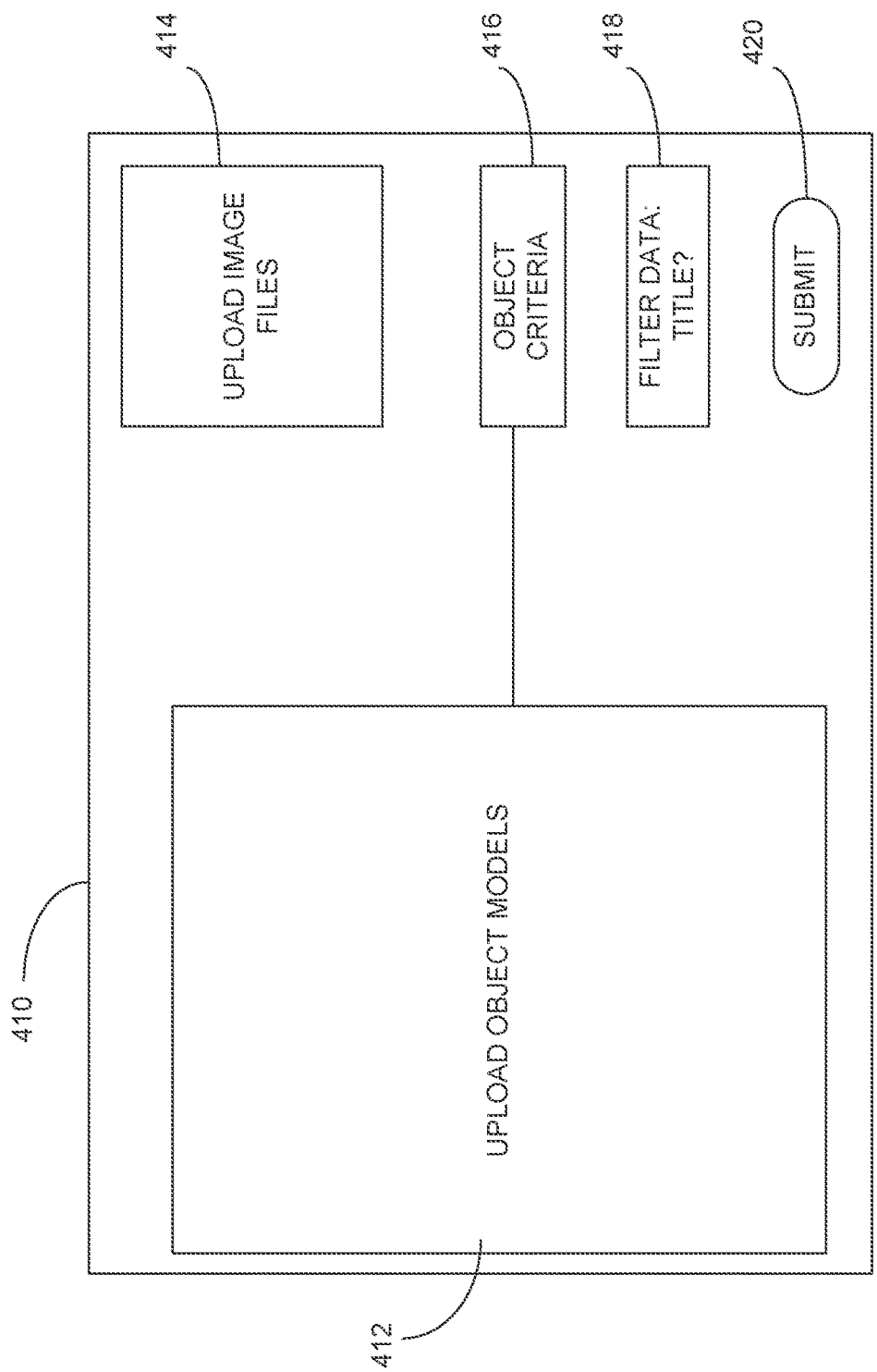
FIG. 4B shows an example of a graphical user interface for a user-based photo filter publication module.

FIG. 4A shows a block diagram illustrating an example embodiment of the user-based photo filter publication module 314. The user-based photo filter publication module 314 shown includes a user-based filter data upload module 402, a user-based object criteria upload module 404, a user based video creation module 406, and a user-based publication engine 408. The user-based photo filter publication module 314 may be implemented on a web server to allow a user to upload the content using a GUI as illustrated in FIG. 4B.

The user-based filter data upload module 402 receives uploaded content from a user. The content may include images such as a photo or a video or other image file types (e.g., .jpeg, .bmp, etc.) The content may also include other data used to generate a photo filter that operates as the user desires. For example, the user may select to have any previously provided photo filters (e.g., to a client device 110) stored in a photo filter collection associated with a client device. The user may then generate photo filters that refer to this collection (e.g., by querying its contents) before they may be provided as a new photo filter to client device 110. In another example, the user may select to have a count of objects of a specified object type identified in photographs taken by the client device 110 stored. The user may then generate photo filters that refer to this count (e.g., by querying its value) before they are provided as a new photo filter to client device 110 in order to adjust a content of the provided photo filter in response to the count reaching a specified threshold value.

The user-based object criteria upload module 404 receives object criteria requirements from the user to instruct photo filter engine 306 regarding the criteria that must be satisfied by an object recognized (e.g., via object recognition module 320) in a photograph before a user-based photo filter may be provided to client device 110. For example, a photograph including an object recognized as a human shoulder may result in the user being presented with photo filters that could overlay a pet bird resting on the shoulder in the photograph. Or a photograph including an object recognized as a known monument may result in the user being presented with photo filters that let the user view information (e.g., historical facts) associated with the monument.

The user-based video creation module 406 receives, from a user, video data (e.g., video or instructions for generating video from a photo by inserting motion) related to specific uploaded filter data and uploaded object criteria. This data may be used by the photo filter publication module engine 314 to generate a user-based photo filter that transforms a photograph into a video based on recognizing a particular object (e.g., the ocean) in the photograph. For example, if a ship is recognized in the foreground of a photograph then the photo filter may alter the background water (e.g., by adding motion) of the photograph to create a video including the recognized ship and ocean objects. Alternatively the photo filter may add motion to the ship object in the foreground of the photograph in order to create a video including the recognized objects.

The user-based publication engine 408 generates a user-based photo filter that associates the uploaded filter data from the user-based filter data upload module 402 with the uploaded object criteria from the user-based object criteria upload module 404. The user-based photo filter may also associate the uploaded video data from the user-based video creation module 402 with uploaded filter data from the user-based filter data upload module 402 and the uploaded object criteria from the user-based object criteria upload module 404. The user-based publication engine 408 publishes the user-based photo filter to client devices for which the photo filter engine 306 has determined that a photograph has been taken that includes a recognized object that satisfies the uploaded object criteria.

FIG. 4B illustrates an example of a GUI 410 for uploading filter data and for uploading object criteria with respect to recognized objects in a photograph. The GUI 410 displays an upload object models box 412, an upload image files box 414, an object criteria box 416, a filter data box 418, and a submit button 420. The upload image files box 414 enables a user to upload image files, (e.g., a photograph or a video) to the user-based filter data upload module 402. The object criteria box 416 enables the user to upload object criteria by inputting specific requirements that must be satisfied by a recognized object in the photograph. The syntax used for specifying object criteria may be particular to the photo filter application (e.g., 122) or a natural language description of the criteria that must be satisfied may be used. Furthermore, object criteria may be specified by the user more explicitly via the upload object models box 412. The user can upload a specific object model to be used by the photo filter engine 306 to compare to objects recognized in a photograph. The object criteria are submitted to the user-based object criteria upload module 404. The filter data box 418 enables the user to submit any other data needed to identify and/or operate the user-based photo filter, for example a title for the user-based photo filter. The user may submit the image files, filter data and object criteria by clicking on the submit button 420. Once the image files, filter data and object criteria are submitted, the user-based publication engine 408 generates a user-based photo filter based on the image files, filter data and object criteria.

Figure 4C:
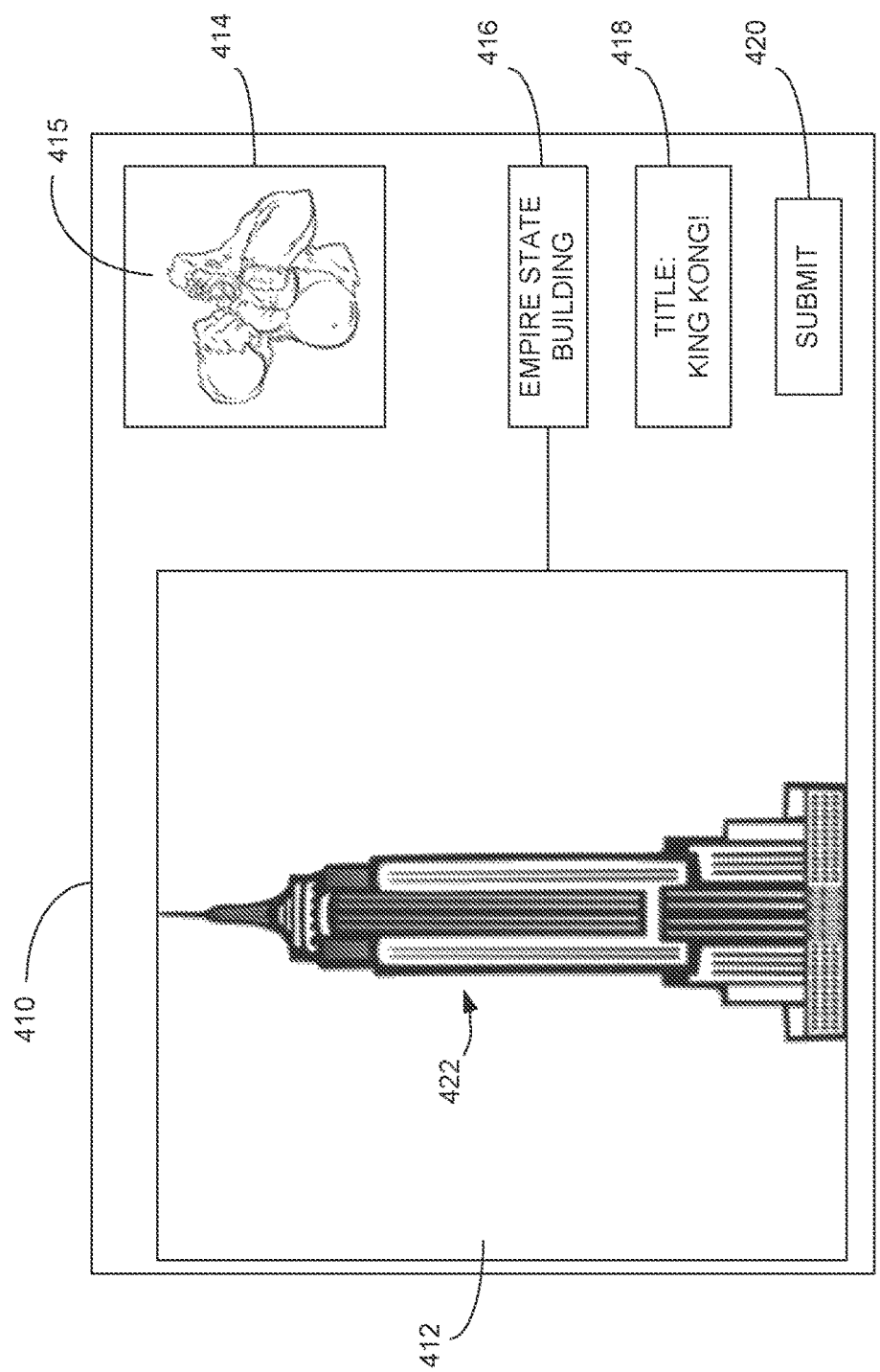
FIG. 4C shows an example of an operation of the graphical user interface of FIG. 4B.

FIG. 4C illustrates an example where the user has uploaded a picture of a gorilla 415 displayed in the upload image box 414. The user has entered the object criteria "Empire State Building" via the object criteria box 418 and uploaded an associated object model 422 via the upload object models box 412. The user has entered the title of the photo filter "King Kong!" in the filter data box 418. The user may submit the picture of the gorilla 415, the object criteria "Empire State Building" (which may be associated with a specified object model 422 in photograph 412) and the filter title "King Kong!" by clicking on the submit button 420. Once the picture of the gorilla 415, the filter title "King Kong!" (and any other filter data) and the object criteria "Empire State Building" are submitted, the user-based publication engine 408 generates a user-based photo filter based on the uploaded content.

Figure 4D:
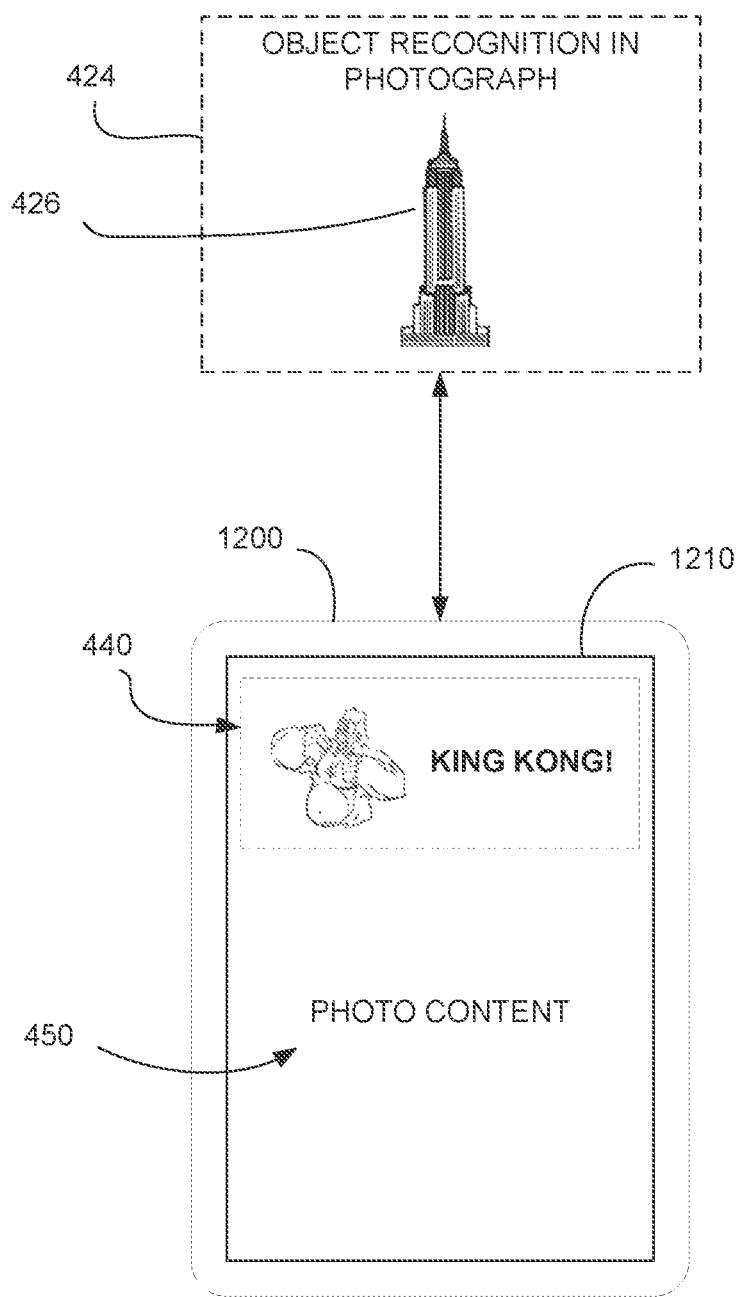
FIG. 4D illustrates an example of a publication of a user-based photo filter.

FIG. 4D illustrates an example of a publication of a user-based photo filter. The photo filter application 122 detects that a mobile device 1200 has taken a photograph 424 that includes the recognized object 426 that corresponds sufficiently to specified object 422 and therefore satisfies the object criteria "Empire State Building". The photo filter application 122 retrieves the user-based photo filter 440 (e.g., "King Kong!") corresponding to the satisfied object criteria "Empire State Building" and publishes the user-based photo filter 440 to the mobile device 1200. The user-based photo filter 440 may then be selected for application to photo content 450 in a display 1210 of the mobile device 1200. For example, the image of a gorilla 415 may be positioned at various locations (e.g., by user tapping on the location) to appear as if King Kong was climbing the object 426 (recognized in photograph 424) that satisfies the object criteria "Empire State Building" associated with user-based photo filter 440.

Figure 5A:
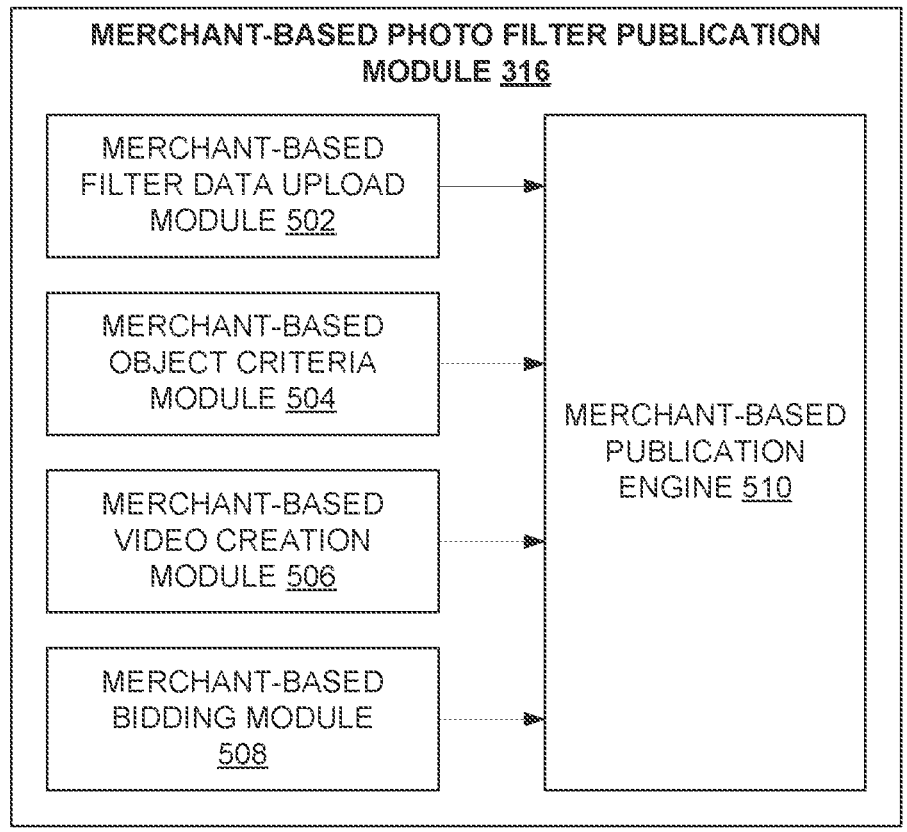
FIG. 5A shows a block diagram illustrating one example embodiment of a merchant-based photo filter publication module.

FIG. 5A shows a block diagram illustrating one example embodiment of the merchant-based photo filter publication module 316. The merchant-based photo filter publication module 316 includes a merchant-based filter data upload module 502, a merchant-based object criteria upload module 504, a merchant-based video creation module 506, a merchant-based bidding module 508, and a merchant-based publication engine 510. The merchant-based photo filter publication module 316 may be implemented on a web server to allow a user to upload the content using a GUI similar to the GUI illustrated in FIG. 4B.

The merchant-based content upload module 502, the merchant-based object criteria upload module 504 and the merchant-based video creation module 506 function in a similar fashion to the respective user based modules 402, 404 and 406. The merchant-based bidding module 508 provides an interface to enable a merchant to submit a bid amount for specific object criteria if other merchants have also uploaded the same object criteria as part of their own merchant-based photo filters. In this way, if a photograph includes a recognized object that satisfies said object criteria common to multiple merchant-based photo filters, then the merchant-based photo filter uploaded by the merchant with the highest bid amount would be provided to the device that took the photograph. A bidding process may be used to determine the merchant with the highest bid amount and that merchant can then exclude publication of photo filters from other merchants that might otherwise be published based upon satisfaction of the common object criteria. The common object criteria may include, for example, a shopping centre sign associated with a shopping centre in which several businesses operate (e.g., have the same street address but different suite numbers). A photograph including a recognized object that satisfies the object criteria (i.e., a photo containing the sign) would then be provided with the merchant-based photo filter uploaded by the merchant with the highest bid amount for the common object criteria.

Figure 5B:
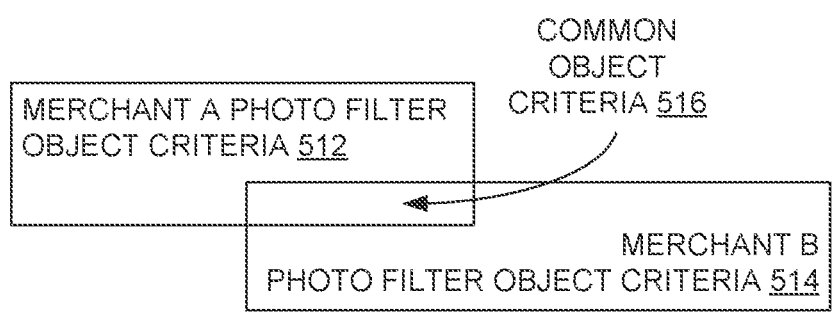
FIG. 5B illustrates an example of a common geolocation.

FIG. 5B illustrates an example of a common object criteria. Merchant A photo filter object criteria overlaps with merchant B photo filter object criteria 514 to define a common object criteria 516. Thus, merchants A and B may submit respective bids corresponding to the common object criteria 516. In one example embodiment, the merchant-based object criteria module 504 determines common object criteria from the object criteria uploaded by the merchants. The merchant-based bidding module 508 identifies a highest bidder for the common object criteria and awards the highest bidder with the ability to exclude other merchant-based photo filters (associated with the common object criteria) from being provided to a device that has taken a photograph including a recognized object that satisfies the common object criteria for a predefined amount of time, e.g., until a next time period for submitting new bids for object criteria.

In another example embodiment, the merchant-based bidding module 508 prorates bid amounts based on corresponding time duration information submitted with the bid. For example, merchant A submits a bid amount of $100 for one day for specific object criteria. Merchant B submits a bid amount of $160 for two days for the same object criteria. The merchant-based bidding module 508 may prorate the bid from merchant B for one day (e.g., $80) and compare both bids for the same period of time (e.g., one day) to determine a highest bidder.

The merchant-based publication engine 510 generates a merchant-based photo filter that associates the uploaded filter data of the highest bidder with the object criteria uploaded by the highest bidder. The merchant-based publication engine 510 publishes the merchant-based photo filter to client devices that have taken a photograph including a recognized object that satisfies the common object criteria 516. Merchant-based photo filters from other merchants that are also associated with the object criteria 516 are excluded from publication to the client devices. In another embodiment, instead of a single merchant-based photo filter for common object criteria, a quota may be placed on the number of merchant-based photo filters available for the common object criteria 516. For example, the merchant-based publication engine 510 may publish and make available a limited number of merchant-based photo filters (e.g., a maximum of two merchant-based photo filters) for the common object criteria 516.

In another example embodiment, the merchant-based publication engine 510 forms a priority relationship that associates the uploaded filter data of the higher bidders with the common object criteria 516. For example, an order in which photo filters are displayed at the client device 110 may be manipulated based on the results from the merchant-based bidding module 508. A photo filter of a merchant with the highest bid may be prioritized and displayed first at the client device 110 when a photograph satisfies the common object criteria 516. Photo filters from other merchants may be displayed at the client device 110 after the photo filter of the highest bidder. Again, as described above, merchant photo filters may be prioritized and displayed according to other processes, including, e.g., on a fix/flat fee or per view/display basis, etc.

Figure 5C:
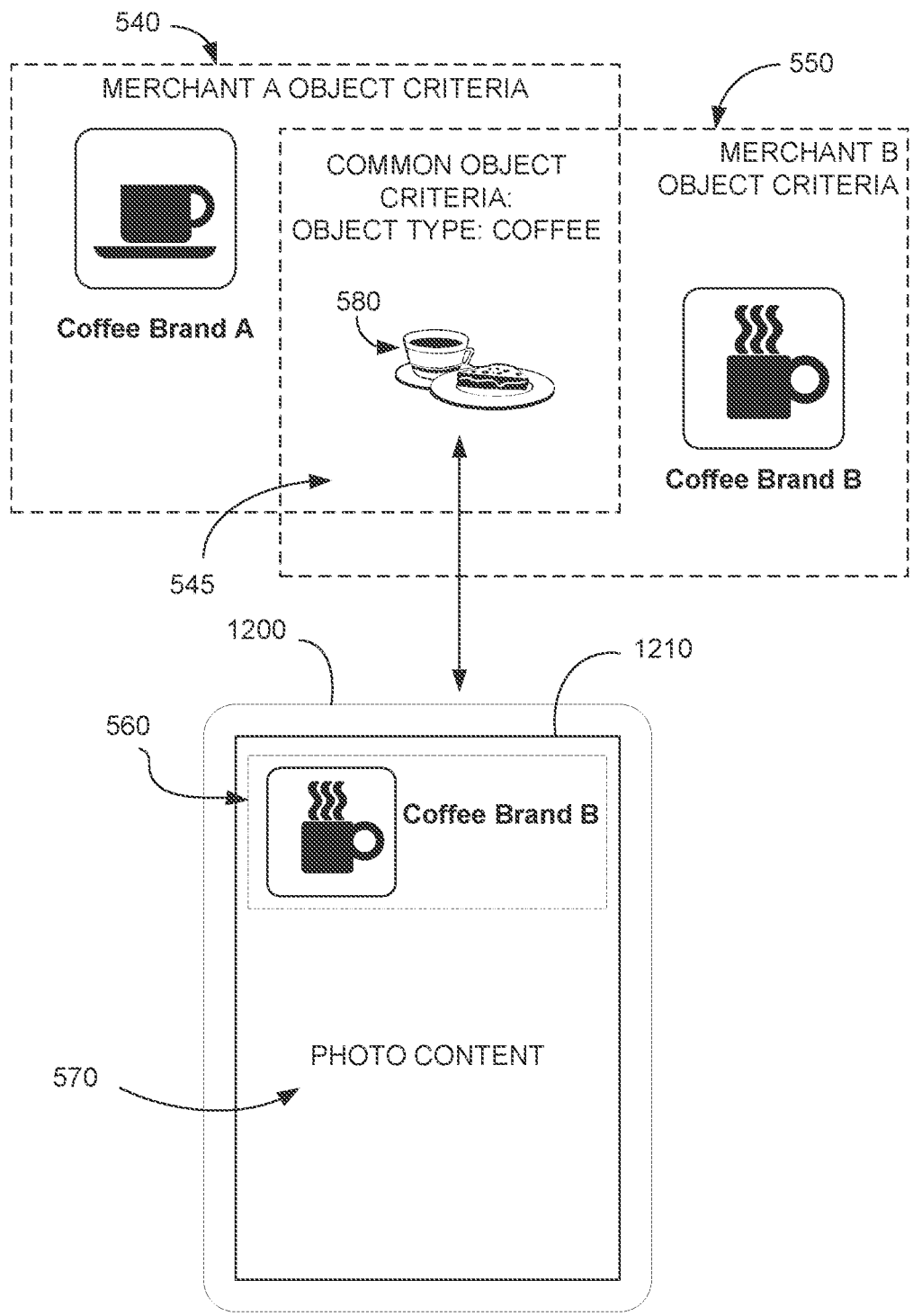
FIG. 5C illustrates an example of an operation of a merchant-based photo filter.

FIG. 5C shows a diagram illustrating an example of a merchant-based photo filter selected based on a bidding process. The object criteria 540 of merchant A and the criteria 550 of merchant B overlap at common object criteria 545. The mobile device 1200 is used to generate the photo content 570 (e.g., used to takes a picture) in the display 1210 of the mobile device 1200. The photo content 570 includes a recognized object 580 that satisfies the common object criteria 545. A photo filter of the merchant with the highest bid for the common object criteria 545 is published to the mobile device 1200. In the present example, merchant B has outbid merchant A for the common object criteria "object type: coffee". The common object criteria "object type: coffee" may refer to any object commonly associated with coffee as well as explicit examples of coffee objects such as a cup of coffee or a coffee bean. As such, photo filter 560 of merchant B (associated with a brand of coffee sold by merchant B) is provided and displayed in the display 1210 on top of the photo content 570. The photo filter 560 is based on the uploaded filter data from merchant B. It should be noted that 'merchant' in the context of the current example embodiments may include not only entities involved in the trade or sale of merchandise but any other entity as well, including individuals, universities, non-profit organizations, student organizations, clubs, etc.

Figure 6A:
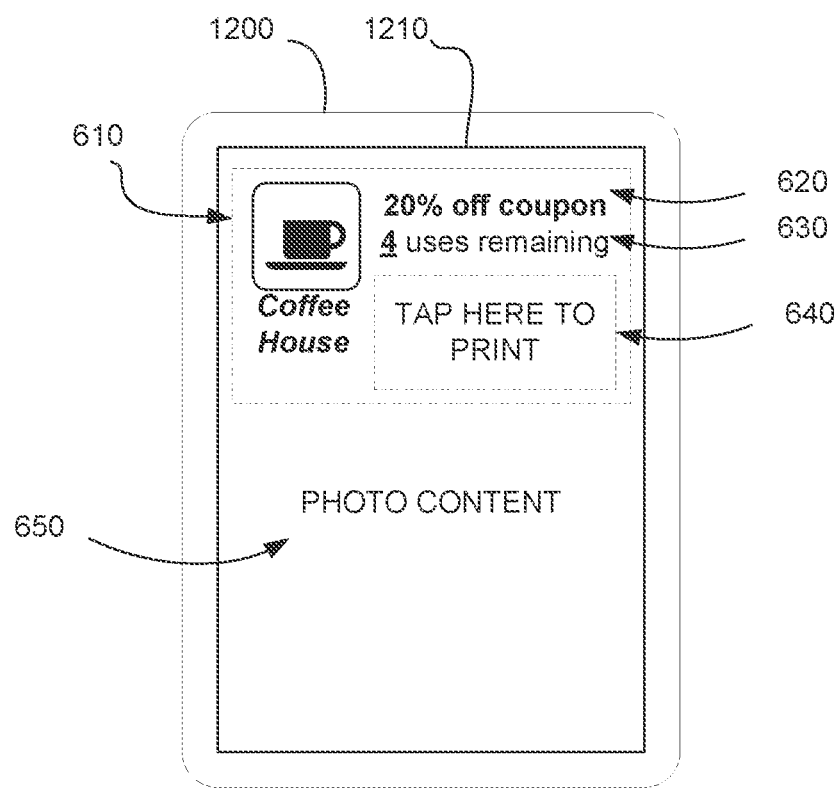
FIG. 6A shows a diagram illustrating an example of a photo filter operating with a count module.

FIG. 6A shows a diagram illustrating an example of a photo filter 610 published on the basis of a count of an object type (e.g., satisfies a specified object criteria such as "cup of coffee") across all of the photographs taken by a mobile device 1200. This count may be processed by count module 326 of photo filter engine 306. For example, the photo filter 610 includes a digital coupon 620 that can be redeemed at a coffee shop "Coffee House". The photo filter 610 may include dynamic content 630. For example, the dynamic content 630 may include a remaining number of times the coupon can be used. The photo filter 610 may include an action button 640 for executing a related action such as printing the coupon. Furthermore, the photo filter 610 may be provided to mobile device 1200 only after the count for the specified object type (e.g., cups of coffee) has surpassed a specified threshold value uploaded by the merchant (e.g., uploaded filter data) associated with the photo filter 610. The mobile device 1200 displays the photo filter 610 with the photo content 650.

Figure 6B:
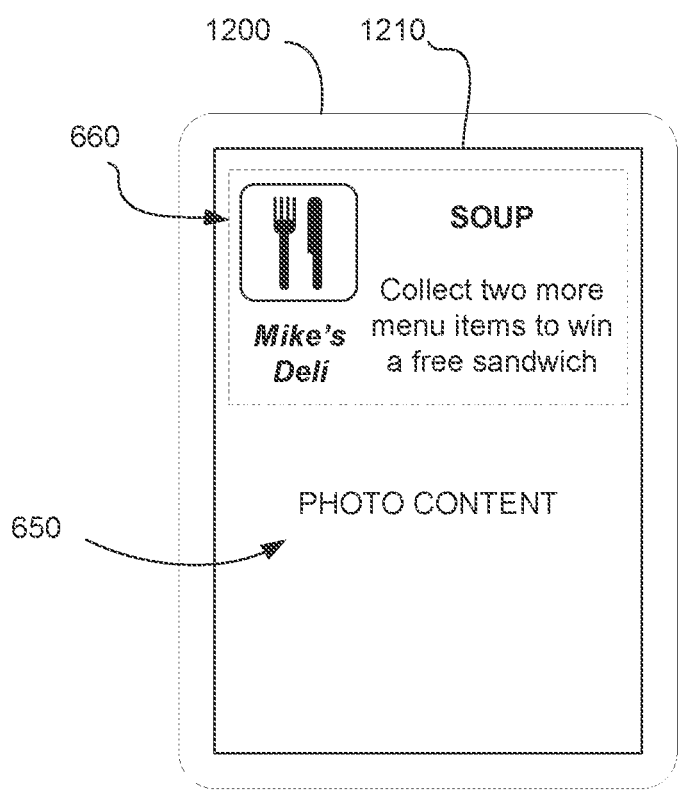
FIG. 6B shows a diagram illustrating an example of a photo filter operating with a collection module.

FIG. 6B shows a diagram illustrating an example of a photo filter 660 published on the basis of a collection of photo filters previously published to a mobile device 1200. In an example embodiment this collection may be processed by collection module 324 of photo filter engine 306. The photo filter 660 can be published to the mobile device 1200 in response to the photo filter publication module 314 determining that a photo filter collection associated with mobile device 1200 has exceeded a minimum number of photo filters a specified type, after which a premium photo filter may be accessed. For example, the collection based photo filter may be used to implement a game at a restaurant (e.g., Mike's Deli) by providing certain premium photo filters (e.g., a "free sandwich" photo filter) to mobile device 1200 only after the mobile device 1200 has collected the required amount of "menu item" type photo filters associated with Mike's Deli. In an example, the premium photo filter may be used to obtain discounts and/or prizes at the restaurant, e.g., a free sandwich. The mobile device 1200 displays the photo filter 660 on top of the photo content 650.

Figure 7:
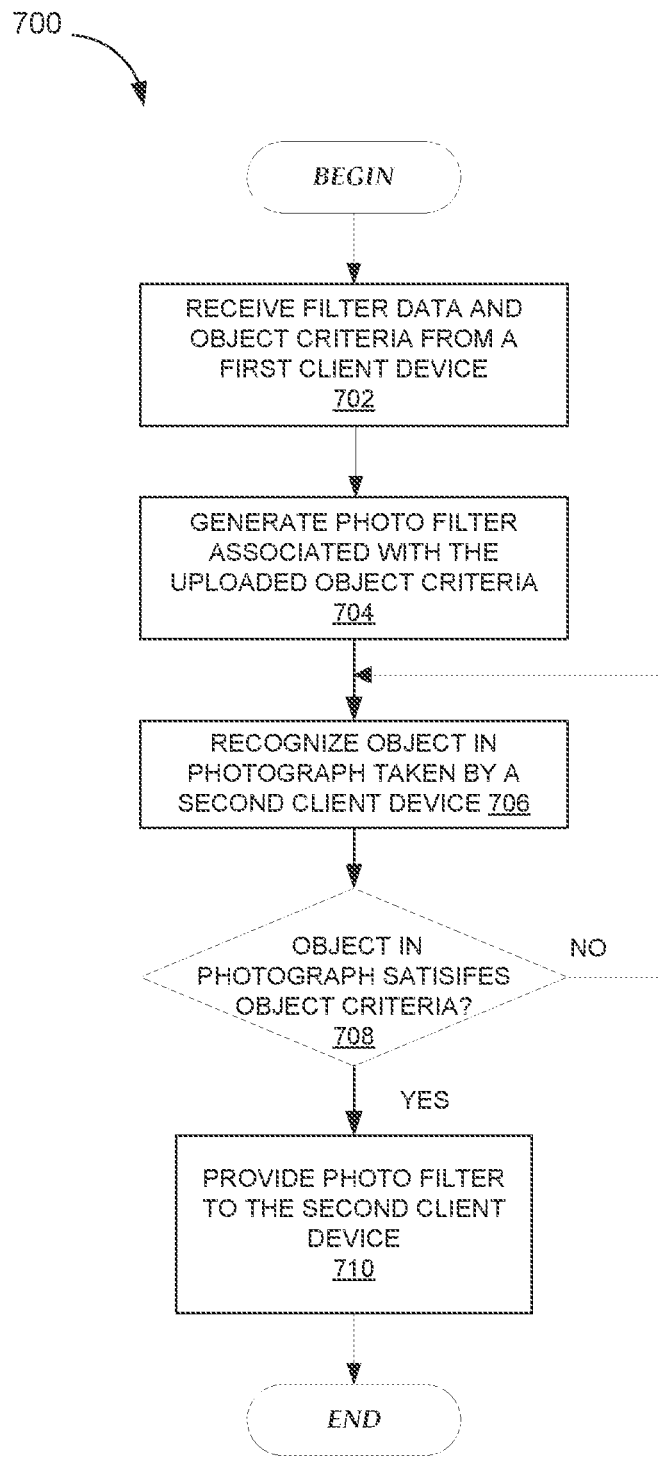
FIG. 7 shows a flow diagram illustrating one example embodiment of an operation of the user-based photo filter publication module.

FIG. 7 shows a flow diagram illustrating one example embodiment of a method 700 of the user-based photo filter publication module 314. At operation 702, the user-based photo filter publication module 314 receives uploaded filter data and uploaded object criteria from a first client device. In one example embodiment, operation 702 may be implemented with the user-based filter data upload module 402, the user-based object criteria upload module 404, and the user-based video creation module 406 of FIG. 4A.

At operation 704, the user-based photo filter publication module 314 generates a user-based photo filter based on the uploaded filter data, and is associated with the uploaded object criteria. In one example embodiment, operation 704 may be implemented with the user-based publication engine 408 of FIG. 4A.

At operation 706, the photo filter engine 306 determines that a photograph has been taken by a second client device and visually searches the photograph in order to perform object recognition on the photograph. At operation 708, the photo filter engine 306 determines whether a recognized object in the photograph satisfies the uploaded object criteria from the first client device. If not, then the method 700 returns to operation 706 in order to search for more objects in the photograph. If the recognized object does satisfy the uploaded object criteria from the first client device then, at operation 710, the user-based photo filter publication module 314 publishes the user-based photo filter from the first client device to the second client device in response. In one example embodiment, operation 710 may be implemented with the user-based publication engine 408 of FIG. 4A.

Figure 8:
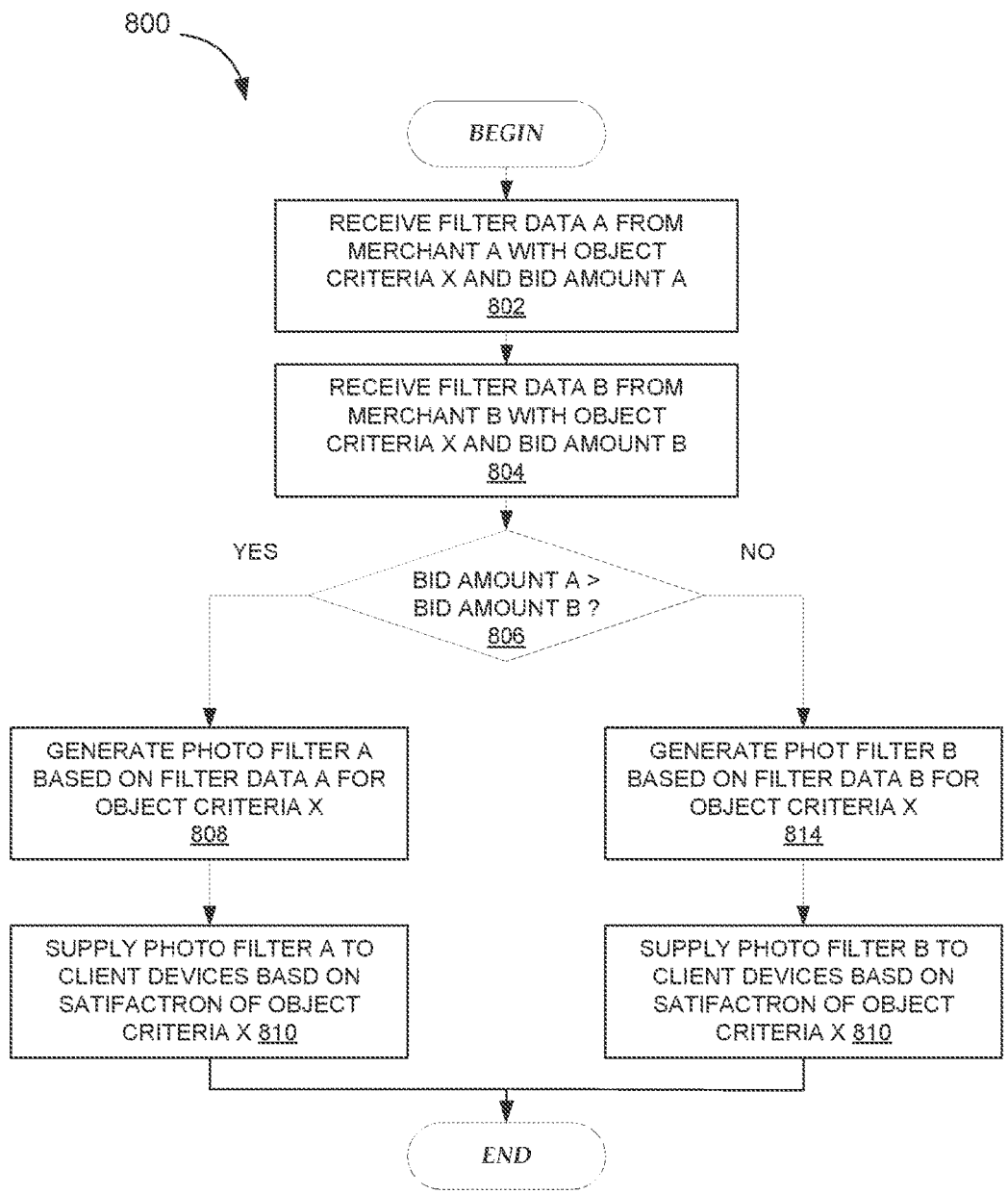
FIG. 8 shows a flow diagram illustrating one example embodiment of an operation of the merchant-based photo filter publication module.

FIG. 8 shows a flow diagram illustrating one example embodiment of a method 800 of operation for the merchant-based photo filter publication module 316. At operations 802 and 804, the merchant-based photo filter publication module 316 receives uploaded filter data, object criteria, and corresponding bid amounts from two merchants. For example, at operation 802, the merchant-based filter data upload module 502 receives filter data A from merchant A. The merchant-based object criteria upload module 504 receives object criteria X from merchant A. The merchant-based bidding module 508 receives bid amount A from merchant A.

At operation 804, the merchant-based content upload module 502 receives content B from merchant B. The merchant-based filter data upload module 502 receives filter data B from merchant B. The merchant-based object criteria upload module 504 receives object criteria X from merchant B. The merchant-based bidding module 508 receives bid amount B from merchant B.

At operation 806, the highest bid amount is determined. In one example embodiment, operation 806 may be implemented with the merchant-based bidding module 508 of FIG. 5A. If bid amount A is greater than bid amount B (as determined by the merchant-based photo filter publication module 322), the merchant-based publication engine 510 generates a merchant-based photo filter A (associated with object criteria X) based on filter data A at operation 808. At operation 810, the merchant-based publication engine 510 supplies merchant-based photo filter A to client devices that have taken a photograph including a recognized object that satisfies object criteria X.

If bid amount B is greater than bid amount A, the merchant-based publication engine 510 generates a merchant-based photo filter B (associated with object criteria X) based on filter data B at operation 814. At operation 816, the merchant-based publication engine 510 supplies merchant-based photo filter B to client devices that have taken a photograph including a recognized object that satisfies object criteria X.

Figure 9:
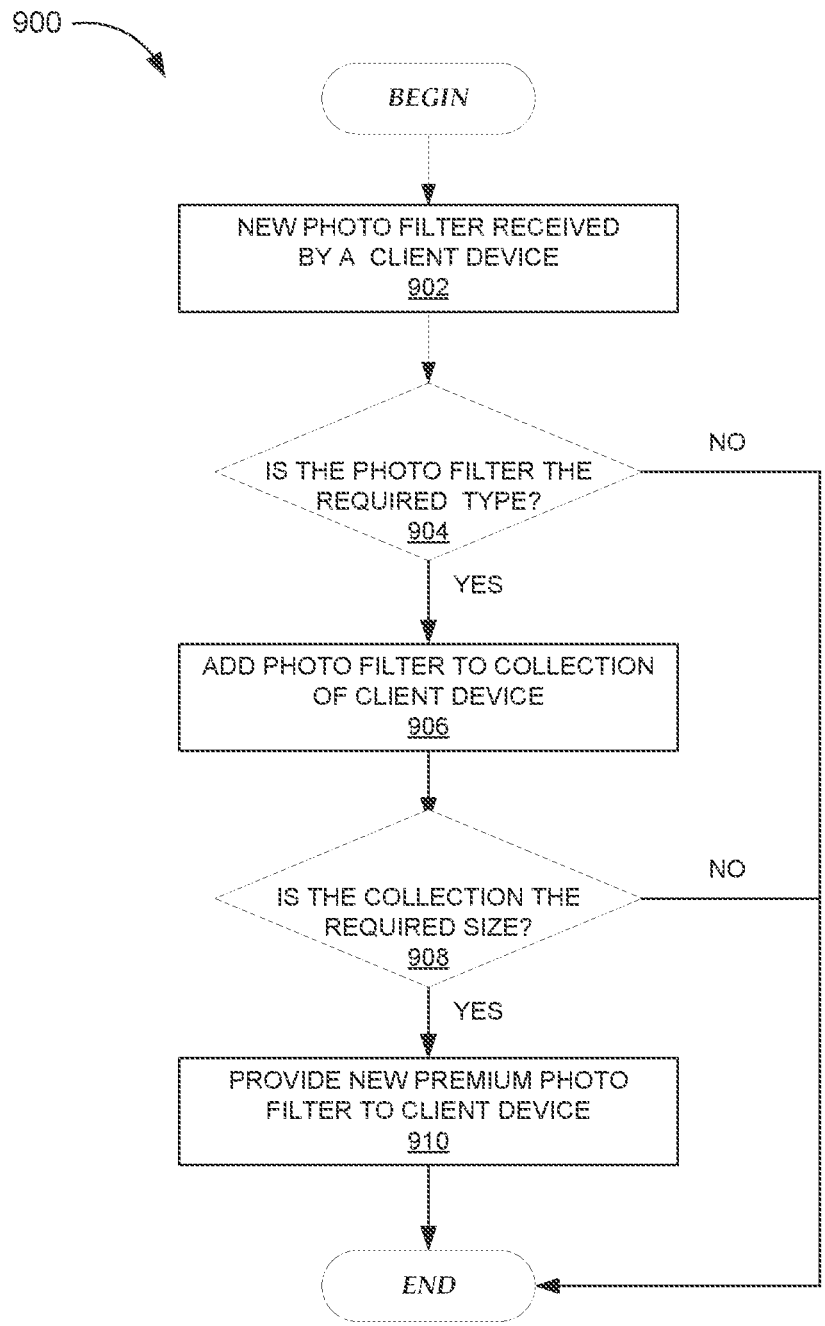
FIG. 9 shows a flow diagram illustrating one example embodiment of an operation of the collection module.

FIG. 9 shows a flow diagram illustrating one example embodiment of a method 900 of operation for collection module 324 of photo filter engine 306. At operation 902, a new photo filter is received by a client device. At operation 904, the collection module 324 determines whether the photo filter is of the same type as the photo filters in a collection of photo filters associated with the client device. If so, at operation 906, the collection module 324 adds the new photo filter to the collection associated with the client device. If not the method 900 ends. At operation 908, the collection module 324 determines whether the collection has reached a specified size threshold. If so, at operation 910, the collection module 324 instructs the photo filter publication module 304 to provide a new premium photo filter to the client device. If not the method 900 ends.

Figure 10:
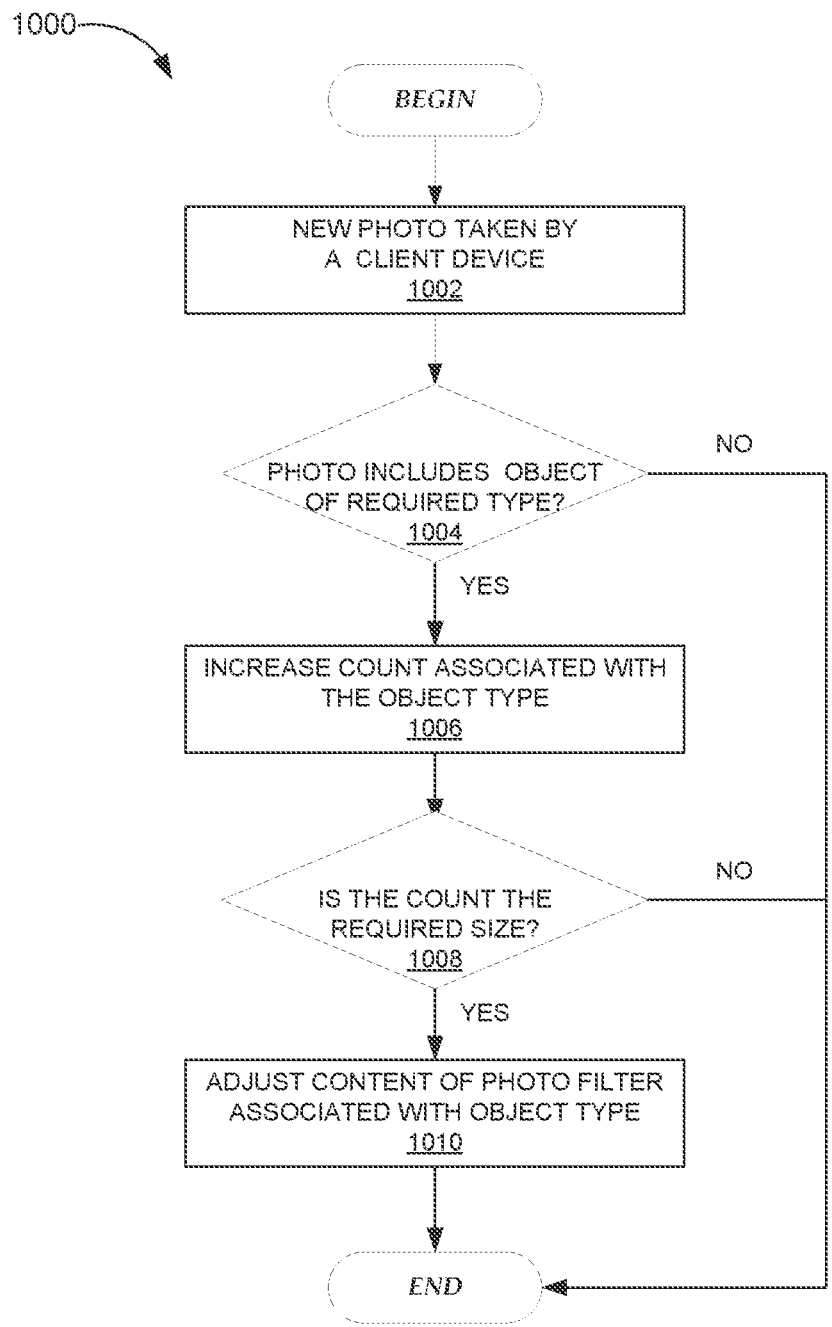
FIG. 10 shows a flow diagram illustrating one example embodiment of an operation of the count module.

FIG. 10 shows a flow diagram illustrating one example embodiment of a method 1000 of operation for count module 326 of photo filter engine 306. At operation 1002, a new photo is taken by a client device. At operation 1004, the count module 324 determines whether the photo includes an object of a specified type, e.g., a type of food. If so, at operation 1006, the count module 326 increases a count of photographed objects (of the specified type) associated with the client device. If not the method 1000 ends. At operation 1008, the count module 326 determines whether the value of the count associated with the client device has reached a specified value threshold. If so, at operation 1010, the count module 324 instructs the photo filter publication module 304 to adjust the content of a photo filter associated with the object type. If not the method 1000 ends.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 11:
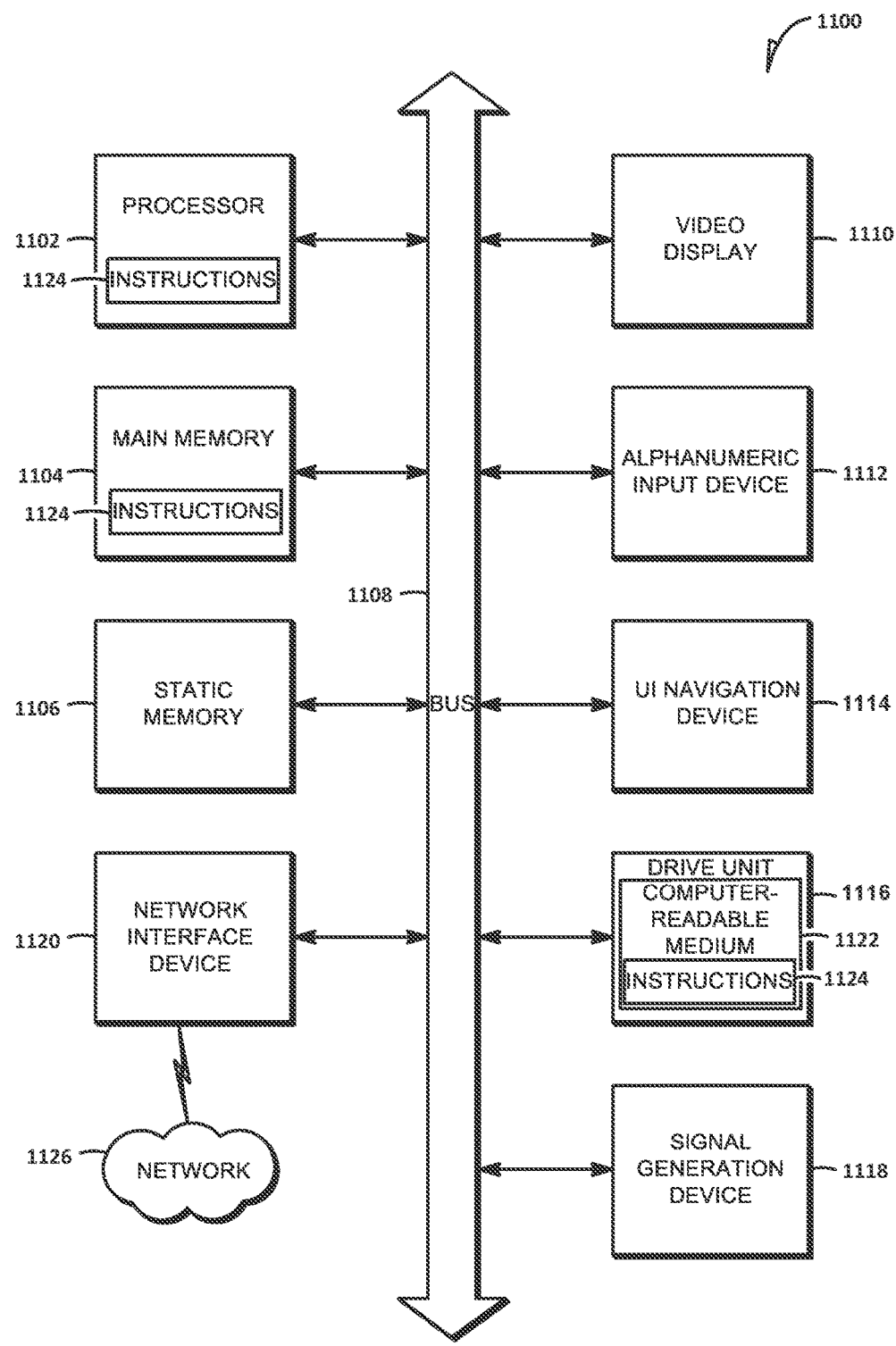
FIG. 11 shows a diagrammatic representation of machine, in the example form of a computer system, within which a set of instructions may be executed to cause the machine to perform any one or more of the methodologies discussed herein.

FIG. 11 shows a diagrammatic representation of a machine in the example form of a machine or computer system 1100 within which a set of instructions 1124 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine 110 and 112 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1124 (sequential or otherwise) that specify actions to be taken by that machine. Further, while only a single machine is illustrated, the term "machine" shall also be taken to include any collection of machines that individually or jointly execute a set (or multiple sets) of instructions 1124 to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a UI navigation device 1114 (e.g., a mouse), a drive unit 1116, a signal generation device 1118 (e.g., a speaker), and a network interface device 1120.

The drive unit 1116 includes a computer-readable medium 1122 on which is stored one or more sets of data structures and instructions 1124 (e.g., software) embodying or used by any one or more of the methodologies or functions described herein. The instructions 1124 may also reside, completely or at least partially, within the main memory 1104 or within the processor 1102 during execution thereof by the computer system 1100, with the main memory 1104 and the processor 1102 also constituting machine-readable photo.

The instructions 1124 may further be transmitted or received over a network 1126 via the network interface device 1120 utilizing any one of a number of well-known transfer protocols (e.g., HTTP).

While the computer-readable medium 1122 is shown in an example embodiment to be a single medium, the term "computer-readable medium" should be taken to include a single medium or multiple photo (e.g., a centralized or distributed database, and/or associated caches and servers) that store the one or more sets of instructions 1124. The term "computer-readable medium" shall also be taken to include any medium that is capable of storing, encoding, or carrying a set of instructions 1124 for execution by the machine that cause the machine to perform any one or more of the methodologies of the present disclosure, or that is capable of storing, encoding, or carrying data structures used by or associated with such a set of instructions 1124. The term "computer-readable medium" shall, accordingly, be taken to include, but not be limited to, solid-state memories, optical photo, and magnetic photo.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 12:
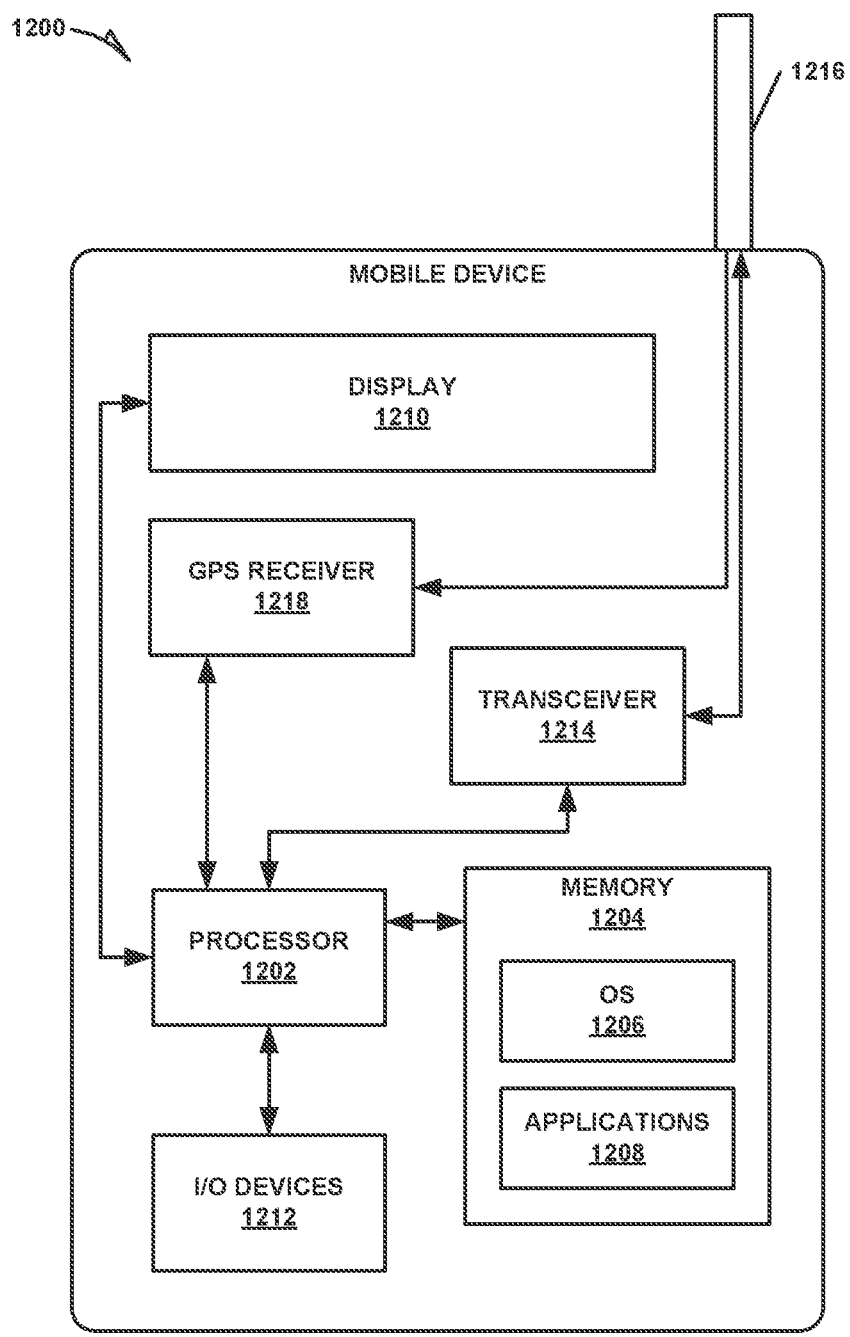
FIG. 12 is a block diagram illustrating a mobile device, according to an example embodiment.

FIG. 12 is a block diagram illustrating a mobile device 1200, according to an example embodiment. The mobile device 1200 may include a processor 1202. The processor 1202 may be any of a variety of different types of commercially available processors 1202 suitable for mobile devices 1200 (for example, an XScale architecture microprocessor, a microprocessor without interlocked pipeline stages (MIPS) architecture processor, or another type of processor 1202). A memory 1204, such as a random access memory (RAM), a flash memory, or another type of memory, is typically accessible to the processor 1202. The memory 1204 may be adapted to store an operating system (OS) 1206, as well as applications 1208, such as a mobile location enabled application that may provide location-based services (LBSs) to a user. The processor 1202 may be coupled, either directly or via appropriate interphotory hardware, to a display 1210 and to one or more input/output (I/O) devices 1212, such as a keypad, a touch panel sensor, a microphone, and the like. Similarly, in some embodiments, the processor 1202 may be coupled to a transceiver 1214 that interfaces with an antenna 1216. The transceiver 1214 may be configured to both transmit and receive cellular network signals, wireless data signals, or other types of signals via the antenna 1216, depending on the nature of the mobile device 1200. Further, in some configurations, a GPS receiver 1218 may also make use of the antenna 1216 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a processor; and
   memory coupled to the processor and storing instructions that, when executed by the processor, cause the system to perform operations comprising:
      detecting that a client device in communication with the system has captured an image;
      identifying an object in the image;
      identifying a location of the object in the image;
      identifying an image overlay associated with the identified location and having object criteria satisfied by the identified object;
      providing the identified image overlay to the client device;
      storing the provided image overlay in a collection of image overlays associated with the client device;
      determining that the collection of image overlays contains more than a specified number of stored image overlays of a specified type; and
      in response to determining that the collection of image overlays contains more than the specified number of stored image overlays of the specified type, providing a new image overlay to the client device.

2. The system of claim 1, wherein the object in the image is in a fixed location, and wherein identifying the location of the object in the image includes determining the fixed location.

3. The system of claim 2, wherein identifying the location of the object in the image includes:
   determining a location of the client device relative to the fixed location of the object;
   determining a perspective of the client device relative to the object based on the location of the client device and the fixed location of the object.

4. The system of claim 3, wherein identifying the image overlay is based on the perspective of the client device relative to the object.

5. The system of claim 3, wherein determining the location of the client device is based on geo-location information for the client device.

6. The system of claim 5, wherein the geo-location information for the client device is contained in metadata associated with a message transmitted from the client device to the system.

7. The system of claim 1, wherein identifying the object in the image includes determining the object is a monument.

8. The system of claim 7, wherein the identified image overlay includes viewable information associated with the monument.

9. The system of claim 1, wherein providing the identified image overlay to the client device includes attaching the identified image overlay to an ephemeral message accessible for a predetermined duration of time.

10. The system of claim 9, wherein providing the identified image overlay to the client device further includes:
    receiving a request from the client device to access the ephemeral message;
    in response to the request, causing the ephemeral message to be displayed on the client device; and
    ceasing display of, and access to, the ephemeral message in response to expiration of the predetermined duration of time.

11. The system of claim 1, wherein identifying the object in the image is based on one or more of: edge matching, grey-scale matching, large model bases, and gradient matching.

12. The system of claim 1, wherein the memory further stores instructions for causing the system to generate an image overlay for transforming the image into a video based on identifying the object in the image.

13. The system of claim 12, wherein transforming the image into the video includes adding motion to one or more of: the identified object in the image, and another object in the image.

14. The system of claim 1, wherein the object criteria for the identified image overlay includes a number of object types.

15. The system of claim 14, wherein the identified object satisfying the object criteria includes the number of object types in a plurality of images captured by the client device meeting or exceeding a predetermined threshold.

16. The system of claim 1, wherein the memory further stores instructions for causing the system to perform operations comprising:
    accessing filter data and object criteria;
    generating an image overlay based on the filter data; and
    storing data specifying an association between the image overlay and the object criteria.

17. The system of claim 16, wherein the generated image overlay is added to a collection of image overlays from which the identified image overlay is selected.

18. The system of claim 16, wherein the filter data and object criteria are received from the client device.

19. A computer-implemented method comprising:
    detecting, by a computer system, that a client device in communication with the computer system has captured an image;
    identifying, by the computer system, an object in the image;
    identifying, by the computer system, a location of the object in the image;
    identifying, by the computer system, an image overlay associated with the identified location and having object criteria satisfied by the identified object;
    providing, by the computer system, the identified image overlay to the client device;
    storing, by the computer system, the provided image overlay in a collection of image overlays associated with the client device;

determining, by the computer system, that the collection of image overlays contains more than a specified number of stored image overlays of a specified type; and in response to determining that the collection of image overlays contains more than the specified number of stored image overlays of the specified type, providing, by the computer system, a new image overlay to the client device.

20. A non-transitory computer-readable medium storing instructions that, when executed by a computer system, cause the computer system to perform operations comprising:

> detecting that a client device in communication with the system has captured an image;
> identifying an object in the image;
> identifying a location of the object in the image;
> identifying an image overlay associated with the identified location and having object criteria satisfied by the identified object;
> providing the identified image overlay to the client device;
> storing the provided image overlay in a collection of image overlays associated with the client device;
> determining that the collection of image overlays contains more than a specified number of stored image overlays of a specified type; and
> in response to determining that the collection of image overlays contains more than the specified number of stored image overlays of the specified type, providing a new image overlay to the client device.

* * * * *

UNITED STATES PATENT AND TRADEMARK OFFICE
CERTIFICATE OF CORRECTION

Page 1 of 1

PATENT NO. : 10,157,449 B1
APPLICATION NO. : 15/661966
DATED : December 18, 2018
INVENTOR(S) : Chang et al.

It is certified that error appears in the above-identified patent and that said Letters Patent is hereby corrected as shown below:

On the Title Page

On page 6, in Column 2, under "Other Publications", Line 13, delete "Allowabiiity" and insert --Allowability-- therefor Signed and Sealed this
Eighteenth Day of June, 2019

Andrei Iancu
*Director of the United States Patent and Trademark Office*